US012650855B2

(12) United States Patent
Koseki et al.

(10) Patent No.: US 12,650,855 B2
(45) Date of Patent: Jun. 9, 2026

(54) INFORMATION PROCESSING APPARATUS AND METHOD

(71) Applicant: Hitachi, Ltd., Tokyo (JP)

(72) Inventors: Yuji Koseki, Tokyo (JP); Atsushi Hirata, Tokyo (JP); Eri Kubo, Tokyo (JP)

(73) Assignee: HITACHI, LTD., Tokyo (JP)

( * ) Notice: Subject to any disclaimer, the term of this patent is extended or adjusted under 35 U.S.C. 154(b) by 285 days.

(21) Appl. No.: 18/599,309

(22) Filed: Mar. 8, 2024

(65) Prior Publication Data

US 2024/0411566 A1 Dec. 12, 2024

(30) Foreign Application Priority Data

Jun. 12, 2023 (JP) ................................. 2023-096491

(51) Int. Cl.
*G06F 9/445* (2018.01)
*G06F 8/65* (2018.01)
*G06F 16/9538* (2019.01)
*G06N 3/08* (2023.01)

(52) U.S. Cl.
CPC .............. *G06F 9/4451* (2013.01); *G06F 8/65* (2013.01); *G06F 16/9538* (2019.01); *G06N 3/08* (2013.01)

(58) Field of Classification Search
CPC ...... G06F 9/4451; G06F 8/65; G06F 16/9538; G06N 3/08
See application file for complete search history.

(56) References Cited

U.S. PATENT DOCUMENTS

| | | | | |
|---|---|---|---|---|
| 2013/0117157 A1* | 5/2013 | Iyoob | .................... | G06Q 30/06 705/26.41 |
| 2019/0171438 A1* | 6/2019 | Franchitti | ................. | G06F 8/65 |

FOREIGN PATENT DOCUMENTS

JP 2015-219795 A 12/2015

* cited by examiner

*Primary Examiner* — Terrell S Johnson
(74) *Attorney, Agent, or Firm* — MATTINGLY & MALUR, PC

(57) ABSTRACT

The information processing apparatus and method are designed to: extract features about requirements including at least a data structure of data to be handled by the target system to be created, a method for analyzing the data, and a method for searching the data; extracts catalogs which satisfy the features of the extracted requirements from among a plurality of kinds of catalogs which are prepared in advance and define data processing flows; extract respective cloud services suited for the requested requirements with respect to each service constitute element of the extracted catalogs; generate one or a plurality of proposed system configurations obtained by combining the extracted cloud services in accordance with the extracted catalogs; and present each of the generated proposed system configurations.

10 Claims, 23 Drawing Sheets

Remarks
A: Data Collection
B: Data Processing
C: Data Retention
D: Data Provision Remarks
A: Data Collection
B1, B2: Data Processing
C: Data Retention
D: Data Provision

FIG. 3

User DB 24

| User ID | User E-mail Address | Notification Necessity |
|---|---|---|
| A0001 | a123.ab@△△△.com | Necessary |
| A0002 | b123.bc@△△△.com | Unnecessary |
| B0001 | c123.cd@△△△.com | Necessary |
| B0002 | d123.de@△△△.com | Unnecessary |
| ... | ... | ... |

Inquiry History DB 25

| Log ID | User ID | Inquiry Implementation Date and Time | Configuration Generation Condition | Feature Extraction Result | Configuration Generation Result | Proposed Configuration Application Result Registration Date and Time | Applied Proposed Configuration | Application Object |
|--------|---------|--------------------------------------|-------------------------------------|----------------------------|----------------------------------|----------------------------------------------------------------------|--------------------------------|--------------------|
| 00001 | A0001 | 2022-10-01 10:00:01 | /aaa/20221001 /C001.txt | /aaa/20221001 /R001.txt | /aaa/20221001 /G001.txt | 2022-10-17 11:01:02 | G0001 | Company X |
| 00002 | B0002 | 2022-10-02 12:34:56 | /aaa/20221002 /C001.txt | /aaa/20221002 /R001.txt | /aaa/20221002 /G001.txt | NULL | NULL | NULL |
| ... | ... | ... | ... | ... | ... | ... | ... | ... |
| 25A | 25B | 25C | 25D | 25E | 25F | 25G | 25H | 25I |

Figures 5A, 5B, 5C:
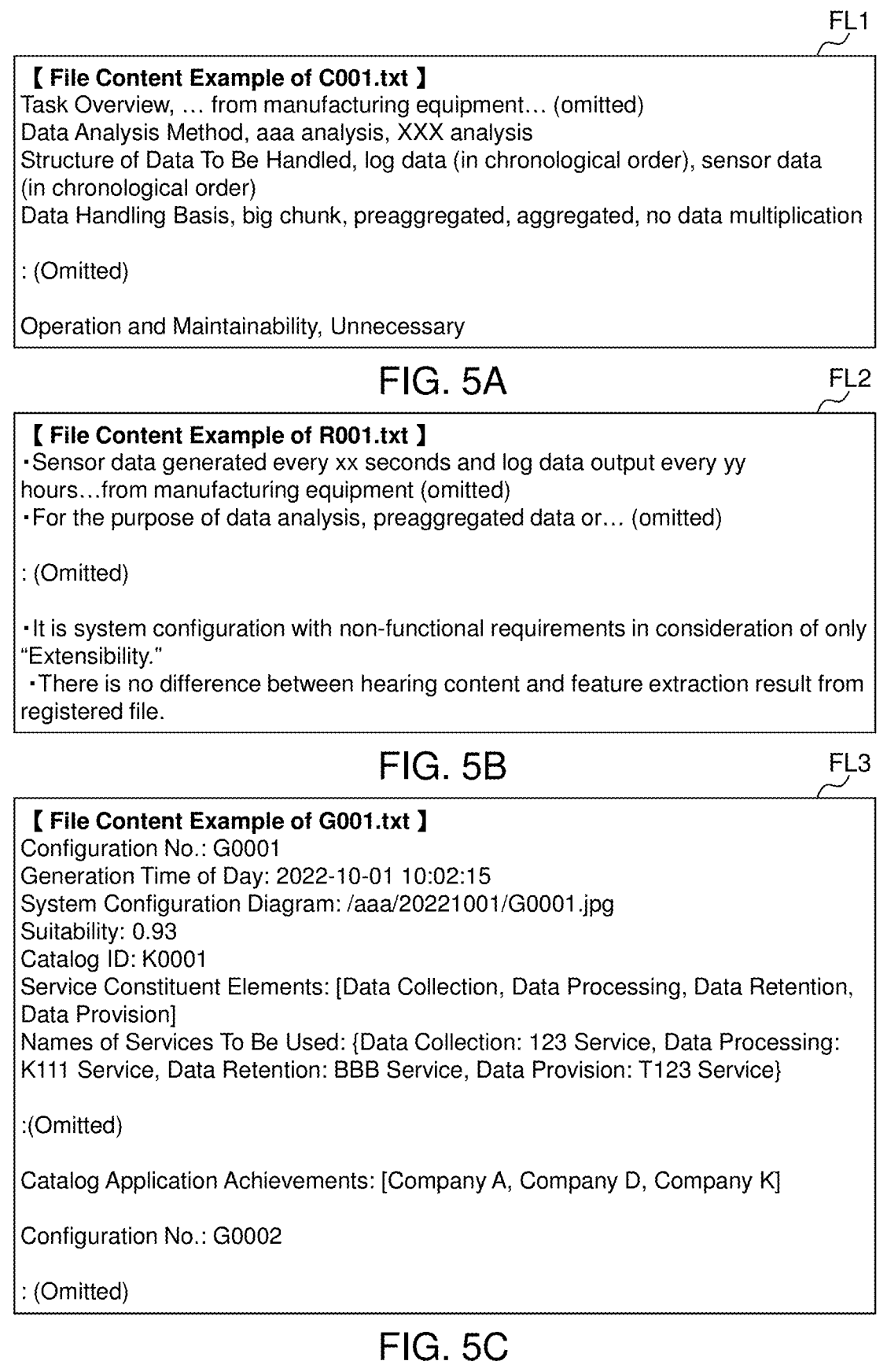

FL1

【 File Content Example of C001.txt 】
Task Overview, ... from manufacturing equipment... (omitted)
Data Analysis Method, aaa analysis, XXX analysis
Structure of Data To Be Handled, log data (in chronological order), sensor data
(in chronological order)
Data Handling Basis, big chunk, preaggregated, aggregated, no data multiplication : (Omitted)

Operation and Maintainability, Unnecessary

【 File Content Example of R001.txt 】
・Sensor data generated every xx seconds and log data output every yy
hours...from manufacturing equipment (omitted)
・For the purpose of data analysis, preaggregated data or... (omitted)

: (Omitted)

・It is system configuration with non-functional requirements in consideration of only
"Extensibility."
 ・There is no difference between hearing content and feature extraction result from
registered file.

【 File Content Example of G001.txt 】
Configuration No.: G0001
Generation Time of Day: 2022-10-01 10:02:15
System Configuration Diagram: /aaa/20221001/G0001.jpg
Suitability: 0.93
Catalog ID: K0001
Service Constituent Elements: [Data Collection, Data Processing, Data Retention,
Data Provision]
Names of Services To Be Used: {Data Collection: 123 Service, Data Processing:
K111 Service, Data Retention: BBB Service, Data Provision: T123 Service}

:(Omitted)

Catalog Application Achievements: [Company A, Company D, Company K]

Configuration No.: G0002

: (Omitted)

Analysis Catalog DB 26

| Catalog ID | Registration Year and Month | Registrant | Catalog Name | Analysis Method | Provider Name | Service Constituent Elements | Application Achievement | Non-functional Requirement (Extensibility) |
|---|---|---|---|---|---|---|---|---|
| K0001 | 2022/04 | A0001 | AAA | XXX Analysis, aaa Analysis | A Co. | [Data Collection, Data Processing, Data Retention, Data Provision] | [Company A, Company D, Company K] | Possible |
| K0002 | 2022/05 | A0002 | BBB | XXX Analysis, aaa Analysis | B Co. | [Data Collection, Data Retention, Data Provision] | [Company B, Company C] | Possible |
| K0003 | 2022/05 | B0001 | CCC | XXX Analysis, aaa Analysis | A Co. | [Data Retention, Data Provision] | NULL | Impossible |
| K0004 | 2022/07 | C0001 | DDD | ZZZ Analysis, bbb Analysis | B Co. | [Data Retention, Data Provision] | [Company E, Company J] | Possible |
| ... | ... | ... | ... | ... | ... | ... | ... | ... |
| 26A | 26B | 26C | 26D | 26E | 26F | 26G | 26H | 26I |

FIG. 7

Cloud Service DB  27

| Service ID | Registration Year and Month | Update Year and Month | Provider | Service Category | Service Name | Availability | Data Structure | Data Handling Basis | Data Search Method | Fee (per Unit Time) |
|---|---|---|---|---|---|---|---|---|---|---|
| H0001 | 2022/01 | 2023/03 | A Co. | Data Retention | AAA Service | Possible | Chronological Order, Log, Sensor Data | Fragmented, Preaggregated | All Access | 45 yen |
| H0002 | 2022/01 | 2023/07 | A Co. | Data Retention | BBB Service | Possible | Chronological Order, Log, Sensor Data | Big Chunk, Preaggregated, Aggregated | All Access, Partition Access | 40 yen |
| H0003 | 2021/12 | 2022/03 | B Co. | Data Retention | A123 Service | Possible | Chronological Order, Log, Sensor Data | Big Chunk, Aggregated, Multiplication | All Access, Partition Access | 30 yen |
| H0004 | 2022/03 | 2022/10 | B Co. | Data Retention | B111 Service | Impossible | Complicated Related Data (Graph Structure) | Fragmented, Multiplication | SQL-like Search Condition Specifying Search | 25 yen |
| ... | ... | ... | ... | ... | ... | ... | ... | ... | ... | ... |
| 27A | 27B | 27C | 27D | 27E | 27F | 27G | 27H | 27I | 27J | 27K |

FIG. 9

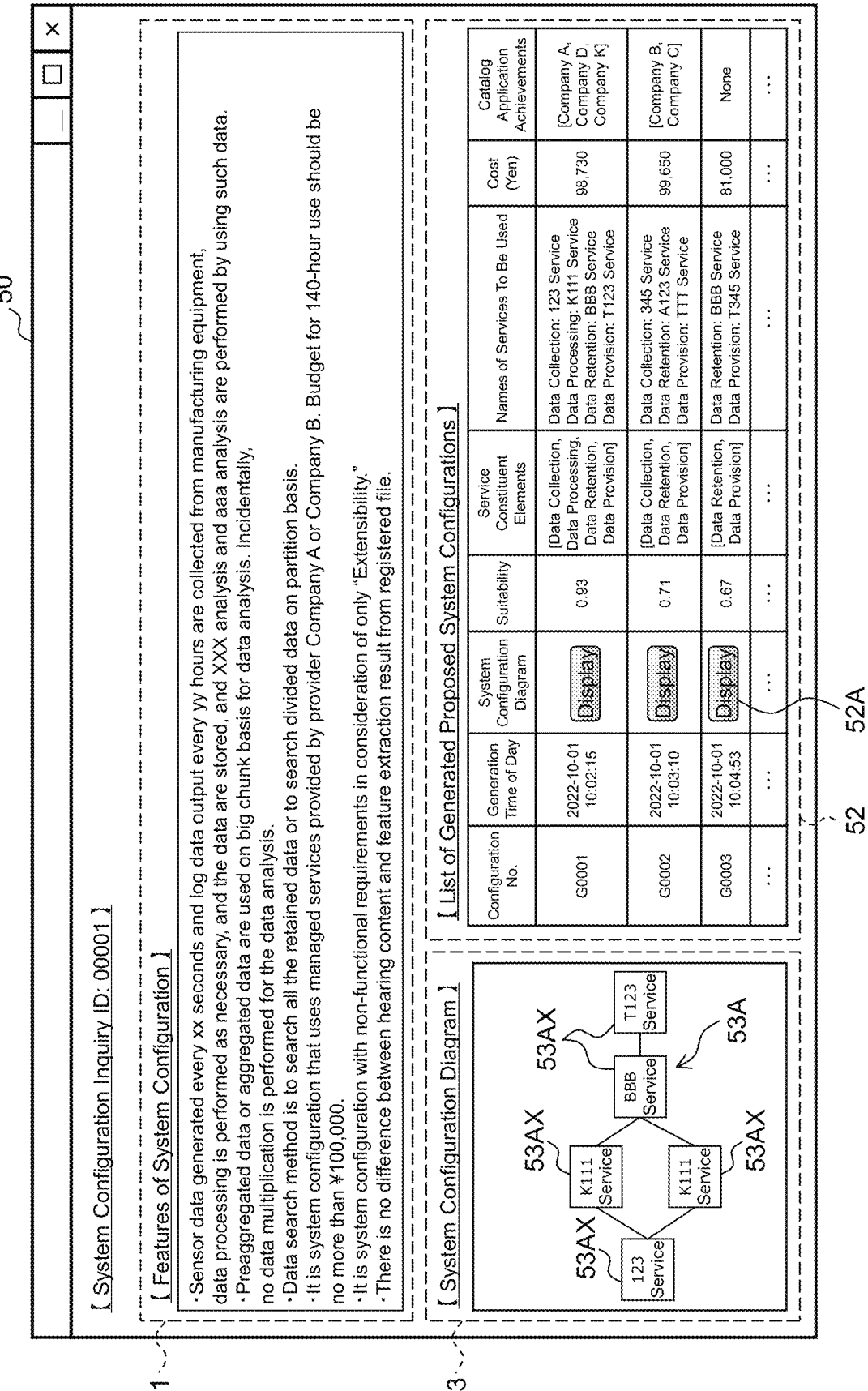

[ System Configuration Inquiry ID: 00001 ]

[ Features of System Configuration ]

· Sensor data generated every xx seconds and log data output every yy hours are collected from manufacturing equipment, data processing is performed as necessary, and the data are stored, and XXX analysis and aaa analysis are performed by using such data.
· Preaggregated data or aggregated data are used on big chunk basis for data analysis. Incidentally, no data multiplication is performed for the data analysis.
· Data search method is to search all the retained data or to search divided data on partition basis.
· It is system configuration that uses managed services provided by provider Company A or Company B. Budget for 140-hour use should be no more than ¥100,000.
· It is system configuration with non-functional requirements in consideration of only "Extensibility."
· There is no difference between hearing content and feature extraction result from registered file.

[ List of Generated Proposed System Configurations ]

| Configuration No. | Generation Time of Day | System Configuration Diagram | Suitability | Service Constituent Elements | Names of Services To Be Used | Cost (Yen) | Catalog Application Achievements |
|---|---|---|---|---|---|---|---|
| G0001 | 2022-10-01 10:02:15 | Display | 0.93 | [Data Collection, Data Processing, Data Retention, Data Provision] | Data Collection: 123 Service Data Processing: K111 Service Data Retention: BBB Service Data Provision: T123 Service | 98,730 | [Company A, Company D, Company K] |
| G0002 | 2022-10-01 10:03:10 | Display | 0.71 | [Data Collection, Data Retention, Data Provision] | Data Collection: 345 Service Data Retention: A123 Service Data Provision: TTT Service | 99,650 | [Company B, Company C] |
| G0003 | 2022-10-01 10:04:53 | Display | 0.67 | [Data Retention, Data Provision] | Data Retention: BBB Service Data Provision: T345 Service | 81,000 | None |
| ⋮ | ⋮ | ⋮ | ⋮ | ⋮ | ⋮ | ⋮ | ⋮ |

52    52A

[ System Configuration Diagram ]

System Configuration Proposing Processing

START

S1

Inquiry acceptance unit accepts inquiry and registers configuration generation condition in inquiry history DB

S2

Configuration Feature Extraction Processing

S3

Configuration Generation Processing

S4

Configuration generation unit transmits the generated system configuration

END

FIG. 12

Configuration Feature Extraction Processing

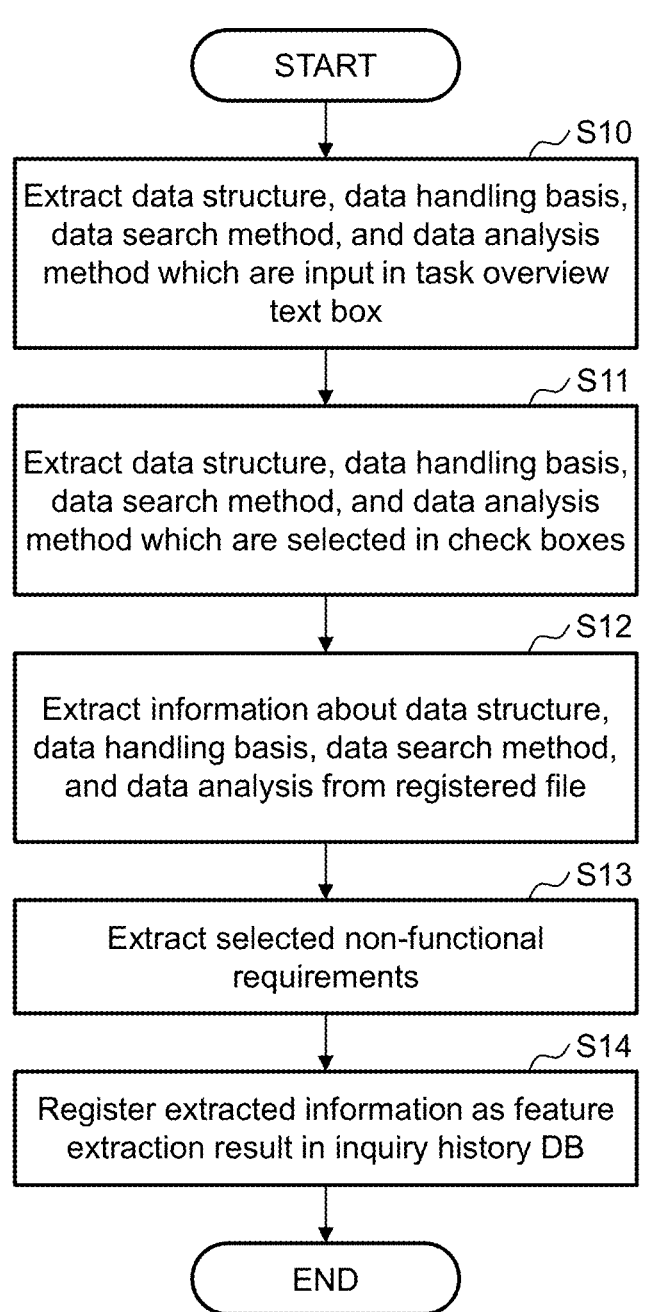

START

S10

Extract data structure, data handling basis, data search method, and data analysis method which are input in task overview text box

S11

Extract data structure, data handling basis, data search method, and data analysis method which are selected in check boxes

S12

Extract information about data structure, data handling basis, data search method, and data analysis from registered file

S13

Extract selected non-functional requirements

S14

Register extracted information as feature extraction result in inquiry history DB

END

FIG. 13A

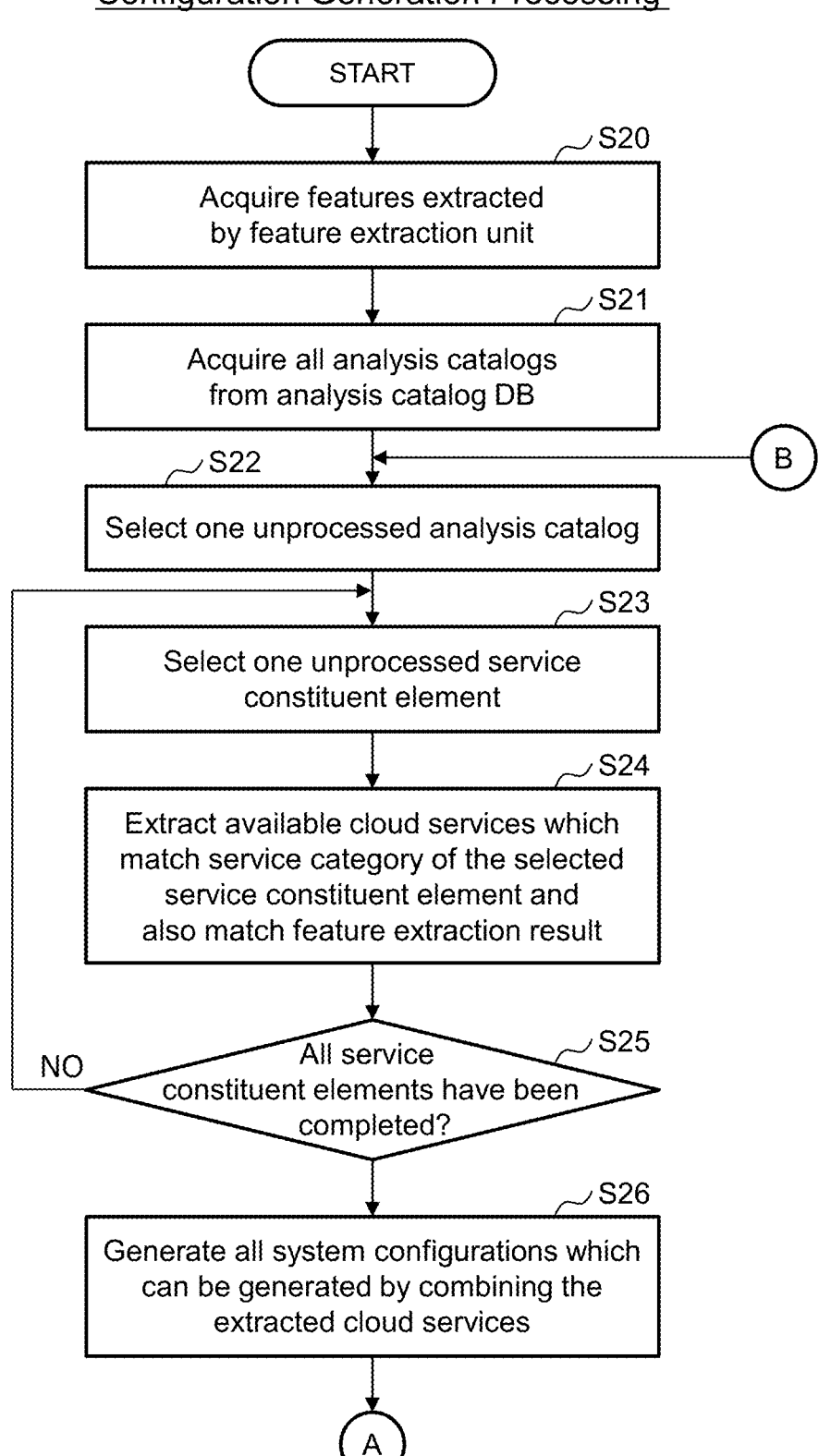

Configuration Generation Processing

START

S20

Acquire features extracted
by feature extraction unit

S21

Acquire all analysis catalogs
from analysis catalog DB

B

S22

Select one unprocessed analysis catalog

S23

Select one unprocessed service
constituent element

S24

Extract available cloud services which
match service category of the selected
service constituent element and
also match feature extraction result

S25

All service
constituent elements have been
completed?

NO

S26

Generate all system configurations which
can be generated by combining the
extracted cloud services

A

Suitability Calculation Processing

FIG. 15

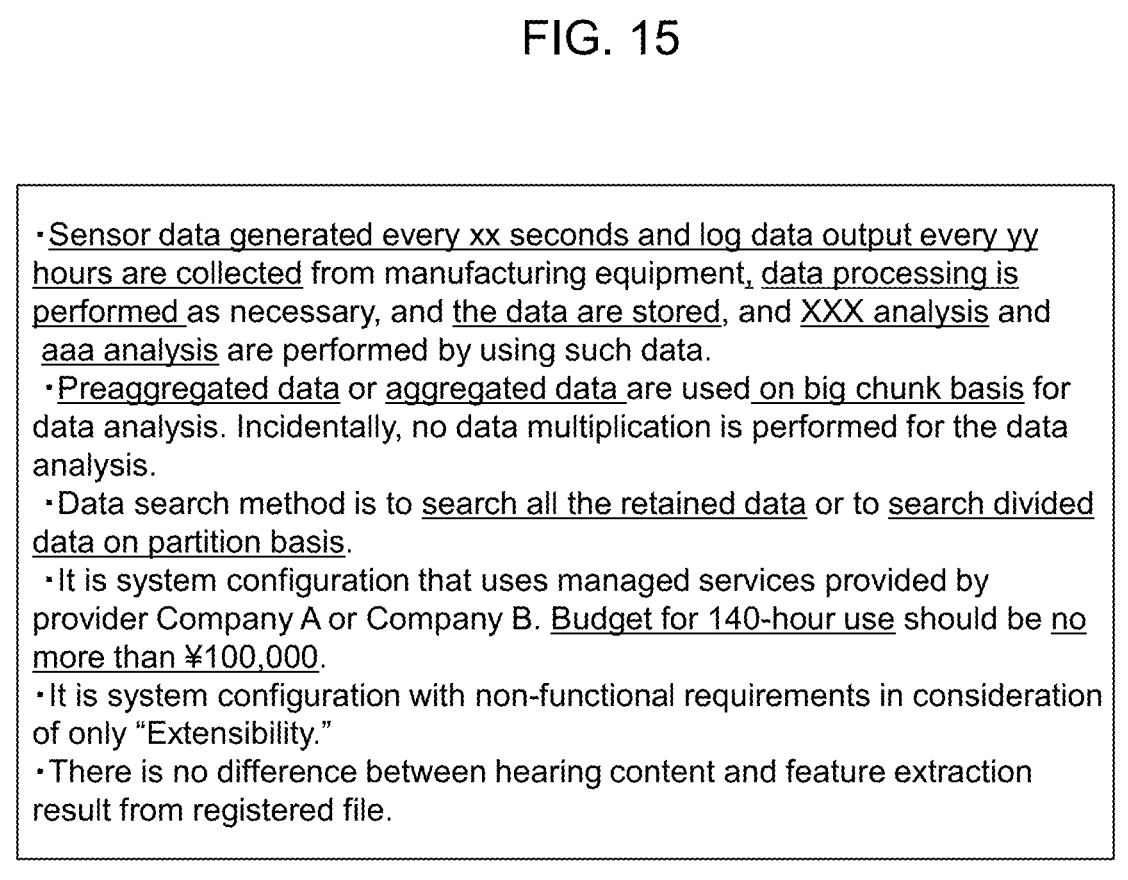

· <u>Sensor data generated every xx seconds and log data output every yy hours are collected</u> from manufacturing equipment, <u>data processing is performed</u> as necessary, and <u>the data are stored</u>, and <u>XXX analysis</u> and <u>aaa analysis</u> are performed by using such data.

· <u>Preaggregated data</u> or <u>aggregated data</u> are used <u>on big chunk basis</u> for data analysis. Incidentally, no data multiplication is performed for the data analysis.

· Data search method is to <u>search all the retained data</u> or to <u>search divided data on partition basis</u>.

· It is system configuration that uses managed services provided by provider Company A or Company B. <u>Budget for 140-hour use</u> should be <u>no more than ¥100,000</u>.

· It is system configuration with non-functional requirements in consideration of only "Extensibility."

· There is no difference between hearing content and feature extraction result from registered file.

Application Result Registration Processing

Cloud Service DB Update Processing

Managed Service Update Notification Processing

First Analysis Catalog DB Update Processing

Second Analysis Catalog DB Update Processing

INFORMATION PROCESSING APPARATUS AND METHOD

CROSS-REFERENCE TO RELATED APPLICATION

The present application claims priority from Japanese application JP2023-096491, filed on Jun. 12, 2023, the content of which is hereby incorporated by reference into this application.

TECHNICAL FIELD

The present invention relates to an information processing apparatus and method and is suited for application to a proposed cloud configuration presenting apparatus for presenting proposed configurations, which satisfy conditions requested by a customer, of a system configuration on a cloud.

BACKGROUND ART

In recent years, cases of constructing a business system by utilizing cloud services have been increasing along with the advance of a cloud technology. When constructing such a business system, it is necessary to examine an optimum system configuration by sufficiently considering the content of tasks to be performed by the business system.

Incidentally, regarding the construction of an information system by utilizing cloud services, PTL 1 proposes a proposed system configuration generating apparatus designed to be capable of generating proposed system configurations, with respect to the configuration of a system that is a combination of a plurality of components involving communications between data centers of a cloud service provider, in consideration of requirements for the communications between the data centers in addition to component requirements desired by a user and presenting such generated proposed system configurations to the user.

CITATION LIST

Patent Literature

PTL 1: Japanese Patent Application Laid-Open (Kokai) Publication No. 2015-219795

SUMMARY OF THE INVENTION

Problems to be Solved by the Invention

Particularly, in a case of a data analysis task system for performing a data analysis task, among various kinds of business systems, many patterns of system configurations may be possible depending on not only the content of the task, but also the structure of data to be handled, a search method (access method), and an analysis method, so that it is difficult to judge which one of those system configurations is the system configuration that is most suited for the task content of the data analysis task system to be constructed at that time.

Therefore, for example, the problem is that even if a provider who provides a consulting service of a business system on the cloud is asked for advice about the configuration of the business system from a customer, it is difficult to propose an optimum system configuration which sufficiently practically satisfies the customer's wishes.

The present invention was devised in consideration of the above-described circumstance and aims at proposing an information processing apparatus and method capable of proposing the optimum system configuration which sufficiently practically satisfies the wishes of the customer who intends to construct the data analysis task system.

Means to Solve the Problems

In order to solve the above-described problem, there is provided according to the present invention an information processing apparatus for presenting proposed configurations, which satisfy requested requirements, of a system configuration on a cloud, wherein the requirements include at least a data structure of data to be handled by a target system to be created, a method for analyzing the data, and a method for searching the data, and wherein the information processing apparatus includes: a configuration feature extraction unit that extracts features regarding the requirements; a catalog extraction unit that extracts catalogs which satisfy the features of the requirements extracted by the configuration feature extraction unit from a plurality of kinds of catalogs which are prepared in advance and define data processing flows; a cloud service extraction unit that extracts respective cloud services suited for the requested requirements with respect to each service constitute element of the catalogs extracted by the catalog extraction unit; a proposed system configuration generating unit that generates one or a plurality of proposed system configurations obtained by combining the cloud services extracted by the cloud service extraction unit in accordance with the catalogs extracted by the catalog extraction unit; and a system configuration presenting unit that presents each of the proposed system configurations generated by the proposed system configuration generating unit.

Moreover, there is provided according to the present invention an information processing method executed by an information processing apparatus for presenting proposed configurations, which satisfy requested requirements, of a system configuration on a cloud, wherein the requirements include at least a data structure of data to be handled by a target system to be created, a method for analyzing the data, and a method for searching the data, wherein the information processing method includes: a first step of extracting features regarding the requirements; a second step of extracting catalogs which satisfy the extracted features of the requirements from a plurality of kinds of catalogs which are prepared in advance and define data processing flows; a third step of extracting respective cloud services suited for the requested requirements with respect to each service constitute element of the extracted catalogs; a fourth step of generating one or a plurality of proposed system configurations obtained by combining the extracted cloud services in accordance with the extracted catalogs; and a fifth step of presenting each of the generated proposed system configurations.

If the information processing apparatus and method according to the present invention is employed, it is possible to propose the system configuration suited for the requested requirements without intervention of a human's judgment.

Advantageous Effects of the Invention

The information processing apparatus and method capable of proposing the optimum system configuration which sufficiently practically satisfies the customer's wishes can be implemented according to the present invention.

BRIEF DESCRIPTION OF DRAWINGS

FIG. 3 is a chart illustrating a configuration example of a user database;

FIG. 4 is a chart illustrating a configuration example of an inquiry history database;

FIG. 5(A) is a conceptual diagram representing a configuration generation condition file, FIG. 5(B) is a conceptual diagram representing a feature extraction result file, and FIG. 5(C) is a conceptual diagram representing a configuration generation result file;

FIG. 6 is a chart illustrating a structure example of an analysis catalog database;

FIG. 7 is a chart illustrating a structure example of a cloud service database;

FIG. 9 is a diagram illustrating a configuration example of a configuration generation result display screen;

FIG. 12 is a flowchart illustrating a processing sequence for configuration feature extraction processing;

FIG. 13A is a flowchart illustrating a processing sequence for configuration generation processing;

FIG. 15 is a diagram for explaining features, which are extracted by a configuration feature extraction unit, of a data analysis task system to be constructed on a cloud by a customer;

DESCRIPTION OF EMBODIMENTS

An embodiment of the present invention will be described below in detail with reference to the drawings.

Figure 1:
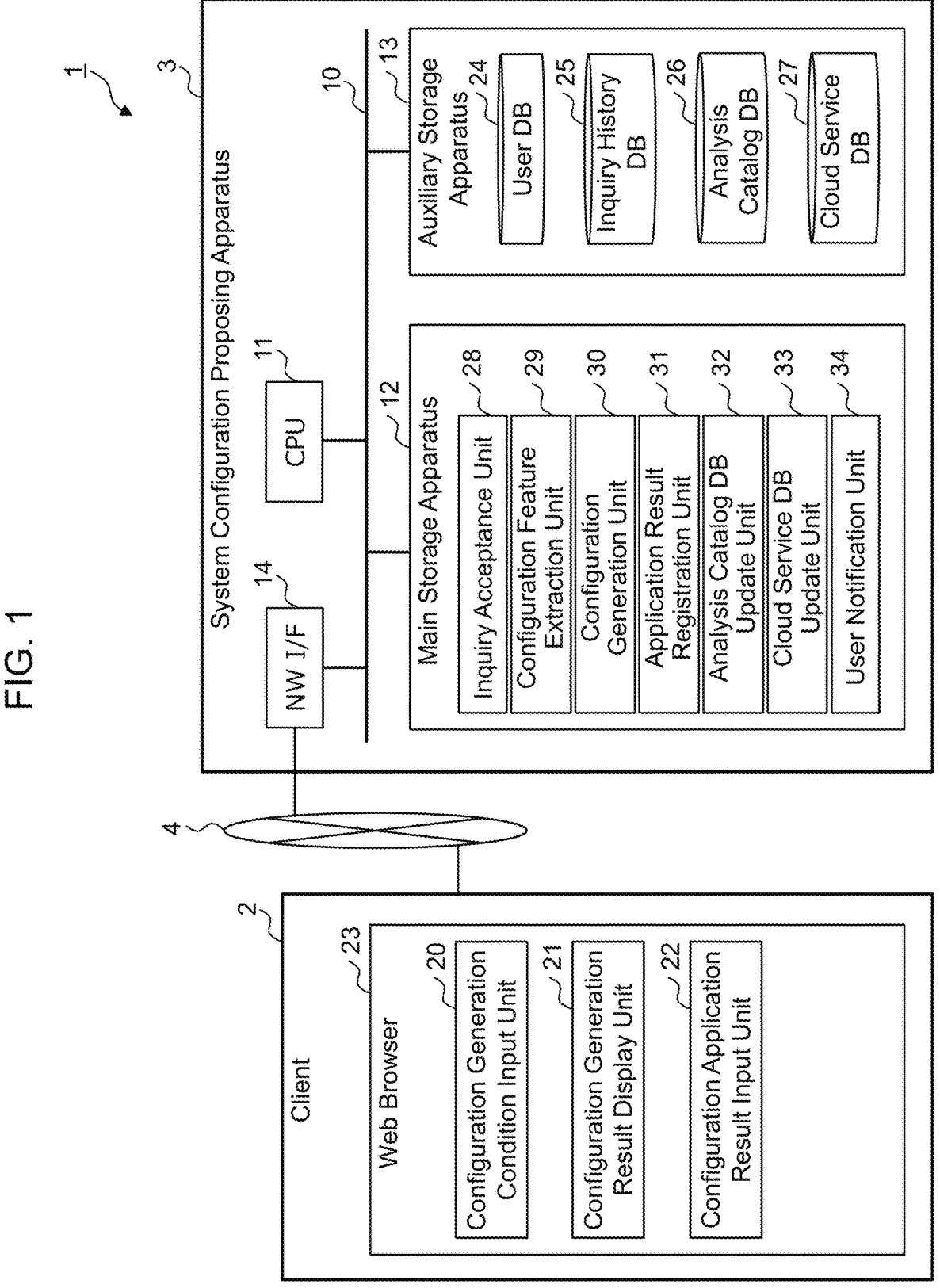
FIG. 1 is a block diagram illustrating the overall configuration of a system configuration proposing system according to this embodiment.

(1) Configuration of System Configuration Proposing System According to this Embodiment Referring to FIG. 1, 1 represents a system configuration proposing system according to this embodiment as a whole.

This system configuration proposing system 1 is configured by including a client 2 and a system configuration proposing apparatus 3.

The client 2 is a computer apparatus used by a user and is configured from a general-purpose computer apparatus including, for example, a CPU (Central Processing Unit), a main storage apparatus, an auxiliary storage apparatus, a communication apparatus, an input apparatus, and a display apparatus. The client 2 is connected with the system configuration proposing apparatus 3 via a network 4.

The system configuration proposing apparatus 3 is configured from a general-purpose server apparatus including a CPU 11, a main storage apparatus 12, an auxiliary storage apparatus 13, and a network interface 14 which are connected to each other via an internal bus 10. The CPU 11 is a processor which controls the operations of the entire system configuration proposing apparatus 3. Also, the main storage apparatus 12 is configured from, for example, a volatile semiconductor memory such as an SRAM (Static Random Access Memory) or a DRAM (Dynamic Random Access Memory) and is used as a working memory of the CPU 11.

The auxiliary storage apparatus 13 is configured from, for example, a large-capacity, nonvolatile storage apparatus such as a hard disk drive or an SSD (Solid State Drive) and is used to store and retain various kinds of programs and data which need to be stored for a long period of time. As the programs stored in the auxiliary storage apparatus 13 are read to the main storage apparatus 12 upon the activation of the system configuration proposing apparatus 3 or whenever necessary, the CPU 11 executes the programs which are read to the main storage apparatus 12, thereby executing various kinds of processing of the entire system configuration proposing apparatus 3 as explained later.

The network interface 14 is configured from, for example, an NIC (Network Interface Card) and performs protocol control upon communication with the client 2 via the network 4.

(2) System Configuration Proposing Function According to this Embodiment

Next, an explanation will be provided about a system configuration proposing function mounted in the system configuration proposing apparatus 3. This system configuration proposing function is a function that generates and proposes proposed system configurations which are most suitable for a customer's request regarding a data analysis task system, which the customer intends to construct on a cloud, mainly from the viewpoints of a data structure of data to be handled by the data analysis task system, a method for searching the data, and a method for analyzing the data.

Figure 8:
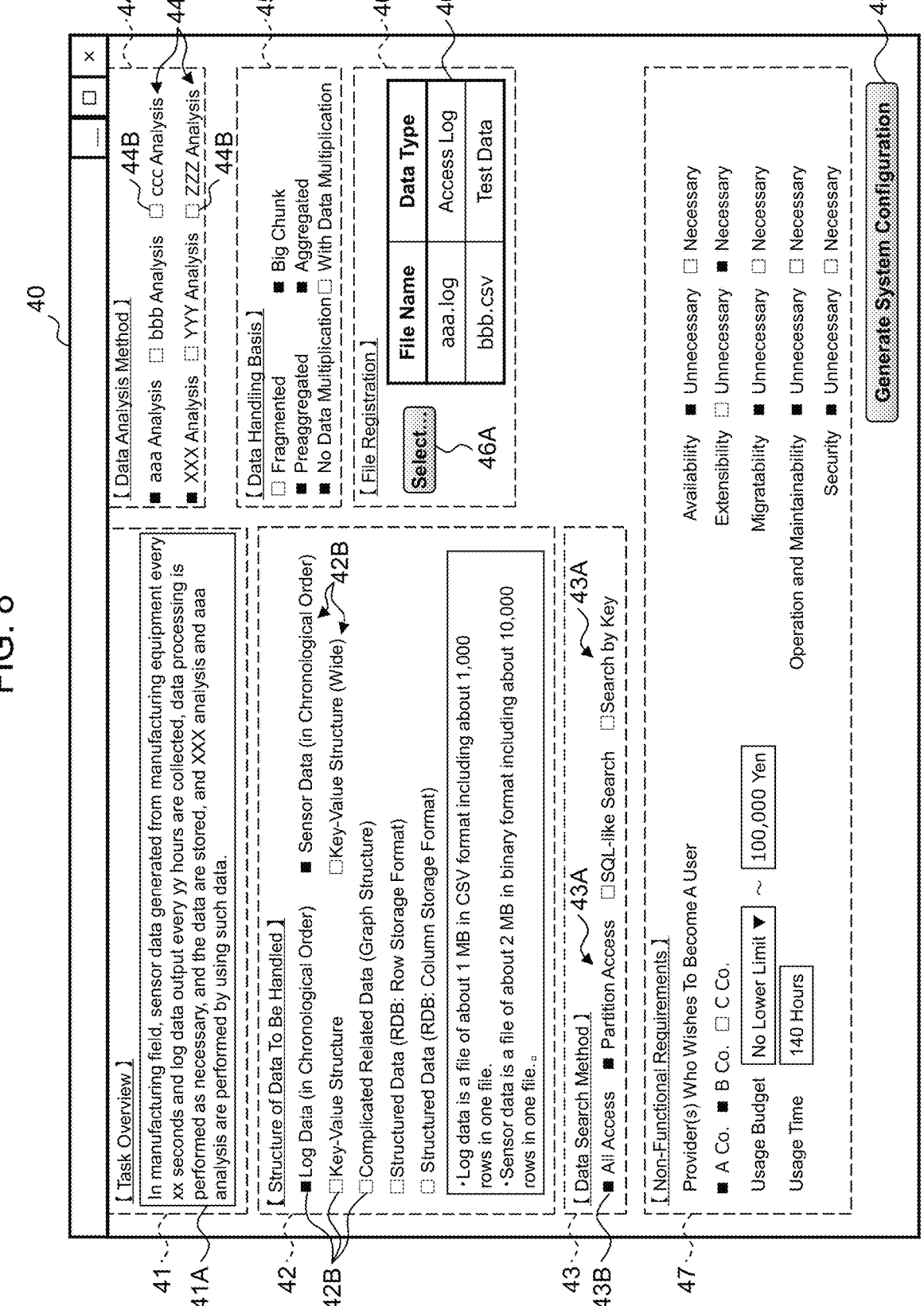
FIG. 8 is a diagram illustrating a configuration example of a configuration generation condition setting screen.

Practically, in a case of this system configuration proposing system 1, the user can set configuration requirements for the data analysis task system, such as the structure of data to be handled by the data analysis task system which is to be constructed at that time (data structure), a search method (data search method), and an analysis method (data analysis method), as configuration generation conditions by using a configuration generation condition setting screen 40 which is displayed on the client 2 by a specified operation and will be described later with reference to FIG. 8. Then, a system configuration generation request including the configuration generation conditions, which are then set, is transmitted from the client 2 to the system configuration proposing apparatus 3.

When the system configuration proposing apparatus 3 receives the system configuration generation request from the client 2, it extracts all analysis catalogs that can be applied to the data analysis task system, which the user intends to construct on the cloud, from among a plurality of analysis catalogs stored in advance according to the configuration generation conditions included in the system configuration generation request.

The "analysis catalog(s)" herein means a template (model) indicating a series of processing for performing a data analysis task as illustrated in, for example, FIG. 2(A) and is composed of information indicating a combination (including a sequential order) of some processing types (hereinafter referred to as "service categories") such as data collection, data processing, data retention, or the data provision, and information of a cloud service provider who is previously set for each service category. The meaning of the "cloud service provider who is previously set for each service category" will be explained later. For example, FIG. 2(A) conceptually indicates an analysis catalog 15 which defines a flow of a series of processing for performing processing of data collected after the data collection (data processing), retaining the processed data (data retention), and providing the retained data (data provision).

Incidentally, each one of the services (A to D in FIG. 2(A)) of each service category in the analysis catalog 15 will be hereinafter referred to as a service constituent element 16. If combination patterns of the service categories are the same, the number of the service constituent elements 16 in each service category may be plural as in, for example, FIG. 2(B).

The system configuration proposing apparatus 3 retains a plurality of kinds of such analysis catalogs 15 in advance and all the analysis catalogs which satisfy the configuration generation conditions included in the system configuration generation request are extracted from these analysis catalogs 15.

Then, the system configuration proposing apparatus 3 generates proposed system configurations of all the combination patterns of cloud services which can be generated by applying each one of the cloud services that are applicable as the relevant service constituent elements 16, from among the various kinds of cloud services which are provided by the cloud service provider and are previously set by the relevant analysis catalog 15 regarding the service category of the relevant service constituent element 16, to each of the service constituent elements 16 of each extracted analysis catalog 15.

Moreover, the system configuration proposing apparatus 3: calculates, as suitability, a degree of how much each proposed system configuration generated as described above satisfies the configuration generation conditions set by the customer; and transmits the details of each proposed system configuration together with the calculated suitability to the client 2, which had transmitted the system configuration generation request. Consequently, a configuration generation result display screen 50 described later with reference to FIG. 9 will be displayed on the client 2.

Furthermore, the system configuration proposing apparatus 3 then issues an instruction to the client 2, which had transmitted the system configuration generation request, to display an application result registration screen 60, which will be described later with reference to FIG. 10, in order to check whether or not the proposed system configuration which was proposed has been applied (whether or not the data analysis task system which has the system configuration of that proposed system configuration has been constructed).

This instruction will be hereinafter referred to as an application result registration screen display instruction.

Then, when the client 2 receives this application result registration screen display instruction, it displays the application result registration screen 60, while it transmits information indicating whether or not the proposed system configuration which was input to the user this application result registration screen 60 by the user and was proposed to that user has been applied, and identification information of that proposed system configuration if it has been applied, to the system configuration proposing apparatus 3. Therefore, the system configuration proposing apparatus 3 generates a new analysis catalog 15 as necessary based on these pieces of information.

As a means for implementing the system configuration proposing function of this embodiment as described above, the client 2 is equipped with a web browser 23 which includes a configuration generation condition input unit 20, a configuration generation result display unit 21, and a configuration application result input unit 22 as illustrated in FIG. 1. Moreover, the auxiliary storage apparatus 13 of the system configuration proposing apparatus 3 stores a user database 24, an inquiry history database 25, an analysis catalog database 26, and a cloud service database 27; and the main storage apparatus 12 of the system configuration proposing apparatus 3 stores an inquiry acceptance unit 28, a configuration feature extraction unit 29, a configuration generation unit 30, an application result registration unit 31, an analysis catalog database update unit 32, a cloud service database update unit 33, and a user notification unit 34 which are read from the auxiliary storage apparatus 13.

The configuration generation condition input unit 20 of the client 2 is a program having a function that collects necessary information from the system configuration proposing apparatus 3 via the network 4 according to the customer's specified operation and displays the aforementioned configuration generation condition setting screen 40 (FIG. 8). Moreover, the configuration generation condition input unit 20 generates a system configuration generation request including the configuration generation conditions, which are set by the customer on this configuration generation condition setting screen 40, and outputs it to the system configuration proposing apparatus 3.

The configuration generation result display unit 21 is a program having a function that displays the aforementioned configuration generation result display screen 50 (FIG. 9), on which one or a plurality of proposed system configurations generated by the system configuration proposing apparatus 3 are posted, on the basis of the information transmitted from the system configuration proposing apparatus 3 after the transmission of the system configuration generation request by the configuration generation condition input unit 20 to the system configuration proposing apparatus 3.

Moreover, the configuration application result input unit 22 is a program having a function that displays the aforementioned application result registration screen 60 (FIG. 10) in response to a request from the system configuration proposing apparatus 3. Practically, when the configuration application result input unit 22 receives the application result registration screen display instruction from the system configuration proposing apparatus 3, it displays the application result registration screen 60, while it transmits information indicating whether the proposed system configuration which was input by the user on this application result registration screen 60 and was proposed to that user has been applied or not, and the identification information of the proposed system configuration if the proposed system configuration has been applied, to the system configuration proposing apparatus 3.

On the other hand, the user database 24 of the system configuration proposing apparatus 3 is a database in which information about the respective users who use this system configuration proposing system 1 is stored. This user database 24 has a table structure, as illustrated in FIG. 3, including a user ID column 24A, a user e-mail address column 24B, and a notification necessity column 24C. In the user database 24, one record (row) in FIG. 3 corresponds to one user.

Then, the user ID column 24A stores identification information (user ID) which is specific to the relevant user and is assigned to the relevant user; and the user e-mail address column 24B stores an e-mail address which is contact information of the relevant user (hereinafter referred to as a "user e-mail address").

Moreover, the notification necessity column 24C stores, when the content of a cloud service which is then used by the relevant user is updated or a new service which is available to the data analysis task system constructed by the relevant user appears, a response result indicating whether a notice to that effect (hereinafter referred to as a "managed service update notice") is desired or not (if the notice is required, "Necessary" is stored; and if the notice is not required, "Unnecessary" is stored).

Therefore, the example in FIG. 3 shows that the user e-mail address of a user who is assigned the user ID "A0001" is "a123.ab@AAA.com" and that user requests the managed service update notice ("Necessary").

The inquiry history database 25 is a database used to store the content of inquiries from the respective users (the content of the configuration generation conditions which were transmitted together with the system configuration generation request). The inquiry history database has a data structure, as illustrated in FIG. 4, including a log ID column 25A, a user ID column 25B, an inquiry implementation date and time column 25C, a configuration generation condition column 25D, a feature extraction result column 25E, a configuration generation result column 25F, a proposed configuration application result registration date and time column 25G, an applied proposed configuration column 25H, and an application object column 25I. In the inquiry history database 25, one record in FIG. 4 corresponds to one inquiry from one user.

Then, the log ID column 25A stores an identifier (log ID) which is assigned to a log of the relevant inquiry and is specific to that log; and the user ID column 25B stores a user ID of a user who made the relevant inquiry. Moreover, the inquiry implementation date and time column 25C stores the date and time when the relevant inquiry was made (the date and time when the system configuration generation request was received); and the configuration generation condition column 25D stores the pathname of a path to a file as illustrated in FIG. 5(A) in which the configuration generation conditions included in the system configuration generation request transmitted from the client 2 in relation to the relevant inquiry are recorded (hereinafter referred to as a "configuration generation condition file").

Furthermore, the feature extraction result column 25E stores the pathname of a path to a file as illustrated in FIG. 5(B) in which information extracted from the configuration generation conditions about, for example, a data structure(s) of data to be handled by the data analysis task system, which the relevant user intends to construct on the cloud, a method(s) for analyzing the data, and a method(s) for searching the data is recorded (hereinafter referred to as a "feature extraction result file"). Furthermore, the configuration generation result column 25F stores the pathname of a path to a file as illustrated in FIG. 5(C) in which a proposed system configuration of the data analysis task system of the customer, which is generated by the system configuration proposing apparatus 3 based on the above-described feature extraction result, is recorded (hereinafter referred to as a "configuration generation result file").

The applied proposed configuration column 25H stores identification information of the relevant proposed system configuration if any one of the proposed system configurations proposed by the system configuration proposing apparatus 3 was applied to the relevant customer. Incidentally, if the system configuration proposing apparatus 3 did not apply the proposed system configuration, which was proposed, to the customer, the applied proposed configuration column 25H stores "NULL."

Moreover, the proposed configuration application result registration date and time column 25G stores the date and time when the system configuration proposing apparatus 3 obtained a response to the inquiry about whether the system configuration proposed to the client 2 has been applied or not. Furthermore, the application object column 25I stores the name of the relevant customer. Incidentally, if the applied proposed configuration column 25H stores "NULL," the application object column 25I also stores "NULL."

Therefore, the example in FIG. 4 shows that a log with the log ID "00001" is a log regarding an inquiry made by a user with the user ID "A0001" at "2022-10-01 10:00:01" and the configuration generation conditions which are set by that user in the relevant inquiry is recorded in a configuration generation condition file FL1 (FIG. 5(A)) on the path called "/aaa/20221001/C001.txt." FIG. 4 also shows that features of the data analysis task system, which are extracted from the configuration generation conditions, are recorded in a feature extraction result file FL2 on the path called "/aaa/20221001/R001.txt" and the proposed system configuration generated by the system configuration proposing apparatus 3 based on these pieces of information is recorded in a configuration generation result file FL3 on the path called "/aaa/20221001/G001.txt." Furthermore, FIG. 4 shows that the proposed system configuration called "G0001" among the proposed system configurations proposed by the system configuration proposing apparatus 3 has been applied to a customer called "Company X."

The analysis catalog database 26 is a database in which analysis catalogs 15 (FIG. 2) which are prepared in advance and registered are stored. This analysis catalog database 26 is configured, as illustrated in FIG. 6, by including a catalog ID column 26A, a registration year and month column 26B, a registrant column 26C, a catalog name column 26D, an analysis method column 26E, a provider name column 26F, a service constituent element column 26G, an application achievements column 26H, and a non-functional requirement column 26I. In the analysis catalog database 26, one record in FIG. 6 corresponds to one analysis catalog 15.

Then, the catalog ID column 26A stores identification information which is assigned to the relevant analysis catalog 15 in the analysis catalog database 26 and is specific to that analysis catalog 15; and the registration year and month column 26B stores the year and month when that analysis catalog 15 was registered in the analysis catalog database 26.

Moreover, the registrant column 26C stores identification information of a registrant who registered the relevant analysis catalog 15 in the analysis catalog database 26; and the catalog name column 26D stores the name assigned to that analysis catalog 15. Furthermore, the analysis method column 26E stores an analysis method(s) which can be applied to that analysis catalog 15; and the provider name column 26F stores the name of a cloud service provider previously set for the respective service categories of that analysis catalog 15.

Furthermore, the service constituent element column 26G stores the names of the service categories of the respective service constituent elements 16 (FIG. 2), which constitute the relevant analysis catalog 15, in a sequential order of the processing; and the application achievements column 26H stores the names of all the customers who have applied the system configuration generated by using that analysis catalog 15.

Furthermore, the non-functional requirement column 26I stores information indicating whether or the not non-functional requirement(s) can be applied to the relevant analysis catalog 15 ("Possible" is stored if the non-functional requirement(s) can be applied; and "Impossible" is stored if the non-functional requirement(s) cannot be applied). The details of the "Non-functional Requirement(s)" will be explained later. Incidentally, FIG. 6 indicates only "Extensibility" as the non-functional requirement; and if the non-functional requirements other than this such as "Availability" and "Migratability" exist (see FIG. 8), the non-functional requirement column 26I may be provided corresponding to each of these non-functional requirements.

Therefore, in the case of an example in FIG. 6, it is shown that an analysis catalog 15 to which the catalog ID "K0001" is assigned is an analysis catalog with the catalog name "AAA" is registered in the analysis catalog database 26 by a registrant called "A0001" in "2022/04." Also, FIG. 6 shows that analysis methods called "XXX Analysis" and "aaa Analysis" can be applied to that analysis catalog 15, which has four service categories, that is, "Data Collection," "Data Processing," "Data Retention," and "Data Provision," and cloud services provided by the cloud service provider called "Company A" should be applied to these service categories. Furthermore, FIG. 6 also shows that this analysis catalog 15 has achievements of application to "Company A," "Company D," and "Company K" and the non-functional requirement can be applied ("Possible").

The cloud service database 27 is a database in which information about various kinds of cloud services provided by the respective cloud service providers is registered. The cloud service database 27 has a data structure, as illustrated in FIG. 7, including a service ID column 27A, a registration year and month column 27B, an update year and month column 27C, a provider column 27D, a service category column 27E, a service name column 27F, an availability column 27G, a data structure column 27H, a data handling basis column 27I, a data search method column 27J, and a fee column 27K. In the cloud service database 27, one record in FIG. 7 corresponds to one cloud service provided by any one of the cloud service providers.

Then, the service ID column 27A stores an identifier which is assigned to the relevant cloud service in the cloud service database 27 and is specific to that cloud service. Moreover, the registration year and month column 27B stores the year and month when the relevant cloud service was registered in the cloud service database 27; and the update year and month column 27C stores the year and month of the relevant update if the information of that cloud service is updated.

Moreover, the provider column 27D stores the name of a cloud service provider who provides the relevant cloud service; and the service category column 27E stores the service category of that cloud service. Furthermore, the service name column 27F stores the name of that cloud service; and the availability column 27G stores information indicating whether that cloud service is currently available or not. In the case of FIG. 7, "Possible" is stored if that cloud service is currently available; and "Impossible" is stored is stored if that cloud service is not available due to, for example, discontinuation of the service provision.

Furthermore, the data structure column 27H stores a data structure(s) of data which can be handled by the relevant cloud service; and the data handling basis column 27I stores data handling basis/bases for which the relevant cloud service can be used (data handling basis/bases). Furthermore, the data search method column 27J stores a method(s) for searching the data by the cloud service (access method(s)); and the fee column 27K stores a usage fee per unit time for the relevant cloud service.

Accordingly, in the case of an example in FIG. 7, it is shown that a cloud service to which the service ID "H0001" is assigned is a cloud service which is provided by the cloud service provider called "Company A" and which was updated in "2023/03" after the registration in the cloud service database in "2022/01" and its service category is the "Data Retention," the service name is "AAA Service," and its utilization is currently "Possible." FIG. 7 also shows that regarding that cloud service, the data structures which can be handled are "Chronological Order, Log, Sensor Data," the data handling basis is "Fragmented, Preaggregated," the data search method is "All Access," and the usage fee per unit time is "45 Yen."

On the other hand, the inquiry acceptance unit 28 of the system configuration proposing apparatus 3 is a program having a function that transmits, to the client 2, necessary information to display the aforementioned configuration generation condition setting screen 40 (FIG. 8) upon a request from the client 2 and then, as a result of the above, accepts the aforementioned system configuration generation request transmitted from the configuration generation condition input unit 20 of the client 2.

The inquiry acceptance unit 28 stores the data of the configuration generation conditions included in the accepted system configuration generation request, as the aforementioned configuration generation condition file FL1 (FIG. 5(A)), in the auxiliary storage apparatus 13 (FIG. 1) and also stores the pathname of the path to the configuration generation condition file FL1 in the configuration generation condition column 25D of the inquiry history database 25 (FIG. 4).

The configuration feature extraction unit 29 is a program having a function that extracts the features of the data analysis task system, which the customer intends to construct on the cloud, such as the data structure of the data to be handled by the data analysis task system, the data search method, and the data analysis method regarding the data, from the configuration generation conditions stored in the inquiry history database 25.

The configuration feature extraction unit 29 stores data of these extracted features, as the aforementioned feature extraction result file FL2 (FIG. 5(B)), in the auxiliary storage apparatus 13 and also stores the pathname of the path to the feature extraction result file FL2 in the feature extraction result column 25E (FIG. 4) of the inquiry history database 25.

The configuration generation unit 30 is a program having a function that generates proposed system configurations of the data analysis task system to be proposed to the user on the basis of the features of the data analysis task system, which are extracted by the configuration feature extraction unit 29, and also calculates the suitability of each of these proposed system configurations with respect to the configuration generation conditions for the data analysis task system which the customer intends to construct on the cloud.

The configuration generation unit 30 transmits the respective generated proposed system configurations and the suitability of these proposed system configurations to the client 2 of the user via the inquiry acceptance unit 28. Moreover, the configuration generation unit 30 stores information of the configurations and the suitability of these respective proposed system configurations, as the aforementioned configuration generation result file FL3 (FIG. 5(C)), in the auxiliary storage apparatus 13 and also stores the pathname of a path to the configuration generation result file FL3 in the configuration generation result column 25F (FIG. 4) of the inquiry history database 25.

The application result registration unit 31 is a program having a function that: inquires of the user about whether the proposed system configuration proposed by the system configuration proposing apparatus 3 has been applied or not at a specified timing as described earlier; and registers the result in the inquiry history database 25 if it obtains a response to that inquiry from the user.

Practically, based on the response obtained from the user, the application result registration unit 31 registers the relevant information respectively in the proposed configuration application result registration date and time column 25G, the applied proposed configuration column 25H, and the application object column 25I of the inquiry history database 25. Moreover, under this circumstance, the application result registration unit 31 updates the application achievements column 26H (FIG. 6) of the relevant record in the analysis catalog database 26 as necessary.

The analysis catalog database update unit 32 is a program having a function that collects necessary information by, for example, crawling the website of each cloud service provider, generates a new analysis catalog based on the obtained information, and registers it in the analysis catalog database 26. Moreover, for example, when the user applies a proposed system configuration with low suitability, from among the proposed system configurations proposed to the user, the analysis catalog database update unit 32 accordingly generates a new analysis catalog 15 and registers it in the analysis catalog database 26.

The cloud service database update unit 33 is a program having a function that collects update information of the cloud services provided by these cloud service providers and information about new cloud services by, for example, crawling the website of each cloud service provider, and updates the cloud service database 27 (FIG. 7) based on the obtained information as necessary.

Practically, when the cloud service database update unit 33 detects any update to the existing cloud service such as a change in the usage fee, it updates the information of the cloud service stored in the cloud service database 27 according to the detected updated change. Moreover, when the cloud service database update unit 33 detects that any cloud service provider has started to provide a new cloud service, the cloud service database update unit 33 registers necessary information about that cloud service in the cloud service database 27.

The user notification unit 34 is a program having a function that transmits the aforementioned managed service update notice to a necessary user when the content of the existing cloud service registered in the cloud service database 27 has been updated by the cloud service database update unit 33 or a new cloud service has been registered in the cloud service database 27.

Practically, the user notification unit 34 searches for a user who can construct a data analysis task system that is more suitable for the requirements requested by the customer (configuration generation conditions) than the current data analysis task system by using the updated existing cloud service or the new cloud service. Then, if such user exists and the user desires to receive the aforementioned managed service update notice, the user notification unit 34 transmits the managed service update notice to the user.

(3) Configurations of Various Kinds of Screens Displayed on Cloud (3-1) Configuration Generation Condition Setting Screen FIG. 8 shows a screen configuration example of the configuration generation condition setting screen 40 that can be displayed on the client 2 by a specified operation. This configuration generation condition setting screen 40 is a screen for setting the configuration generation conditions of the data analysis task system that the customer intends to construct on the cloud.

Practically, as illustrated in FIG. 8, the configuration generation condition setting screen 40 is configured by including a task overview area 41, a data structure setting area 42, a data search method setting area 43, a data analysis method setting area 44, a data handling basis setting area 45, a registered file designating area 46, and a non-functional requirements setting area 47, and a system configuration generation button 48.

Then, the task overview area 41 is provided with a task overview text box 41A, and the task overview of the data analysis task system which the customer intends to construct on the cloud is displayed in this task overview text box 41A. In this case, the "Task Overview" is required to include each piece of information of the data structure(s) of the data to be handled by the data analysis task system, the data search method(s), and the data analysis method(s).

In this embodiment, it is assumed that a person in charge of the provider who retains the system configuration proposing apparatus 3 and provides the system configuration proposing service enters the task overview by hearing from a customer in advance; however, the user may enter the task overview directly in the task overview text box 41A.

Moreover, character strings 42A respectively representing some data structures and check boxes 42B provided respectively corresponding to these character strings 42A are displayed in the data structure setting area 42. Then, in the data structure setting area 42, by clicking a desired check box(es) 42B among these check boxes 42B and causing a display format of the check box(es) 42B to make the transition to the selected display format ("■" in FIG. 8 and the same applies hereinafter), the data structure(s) corresponding to the check box(es) 42B can be set as the data structure(s) of the data to be handled in the data analysis task system that the customer intends to construct on the cloud.

Furthermore, character strings 43A respectively representing some data search methods and check boxes 43B provided respectively corresponding to these character strings 43A are displayed in the data search method setting area 43. Then, in the data search method setting area 43, by clicking a desired check box(es) 43B among these check boxes 43B and causing a display format of the check box(es) 43B to make the transition to the selected change format, the data search method(s) corresponding to the check box(es) 43B can be set as the data search method(s) for the data to be handled by the data analysis task system that the customer intends to construct on the cloud.

On the other hand, character strings 44A representing some data analysis methods and check boxes 44B provided respectively corresponding to these character strings 44A are displayed in the data analysis method setting area 44. Then, in the data analysis method setting area 44, by clicking a desired check box(es) 44B among these check boxes 44B and causing a display format of the check box(es) 44B to make the transition to the selected display format, the data analysis method corresponding to the check box(es) 44B can be set as the data analysis method(s) for the data to be handled by the data analysis task system that the customer intends to construct on the cloud.

Moreover, character strings 45A respectively representing some data handling bases and check boxes 45B corresponding to these character strings 45A are displayed in the data handling basis setting area 45. Then, in the data handling basis setting area 45, by clicking a desired check box(es) 45B among these check boxes 45B and causing a display format of the check box(es) 45B to make the transition to the selected display format, the data handling basis/bases corresponding to the check box(es) 45B can be set as the data handling basis/bases for the data to be handled by the data analysis business system that the customer intends to construct on the cloud.

When there is a file such as an access log or test data obtained when the customer experimentally produces a data analysis task system in advance, the registered file designating area 46 is an area for designating that file as reference information and providing it to the system configuration proposing apparatus 3. Practically, the registered file designating area 46 is provided with a file selection button 46A, and that file can be designated from a list of registered files (which is not illustrated in the drawing) that are displayed by clicking this file selection button 46A. Then, the file name and the data type of each file then designated are displayed in the selected file list 46B.

The non-functional requirements setting area 47 is an area for setting the requirements other than functions (hereinafter referred to as "non-functional requirements") for the data analysis task system that the customer intends to construct on the cloud. In this non-functional requirements setting area 47, the customer can set a cloud service provider to be used, the budge (usage) for using the constructed data analysis task system, and total usage time of the data analysis task system to be constructed, and set the requirements regarding, for example, whether the availability, extensibility, migratability, operation and maintainability, and security exist or not.

Then, the user can transmit the aforementioned the system configuration generation request including the configuration generation conditions set by using this configuration generation condition setting screen 40 to the system configuration proposing apparatus 3, by clicking the system configuration generation button 48 after setting the necessary items in the task overview area 41, the data structure setting area 42, the data search method setting area 43, the data analysis method setting area 44, the data handling basis setting area 45, the registered file designating area 46, and the non-functional requirements setting area 47 of the configuration generation condition setting screen 40. Incidentally, when a file is designated in the registered file designating area 46, data of this file is also transmitted to the system configuration proposing apparatus 3 as the system configuration generation conditions.

(3-2) Configuration Generation Result Display Screen

On the other hand, FIG. 9 shows the configuration generation result display screen 50 in which a proposed system configuration generated by the system configuration proposing apparatus 3 is displayed based on the configuration generation conditions transmitted from the client 2 to the system configuration proposing apparatus 3 as described above.

When the information about each proposed system configuration generated by the system configuration proposing apparatus 3 is transmitted from the system configuration proposing apparatus 3 to the client 2 after the system configuration generation button 48 is clicked on the aforementioned configuration generation condition setting screen 40, this configuration generation result display screen 50 is displayed on the client 2 in place of the configuration generation condition setting screen 40.

This configuration generation result display screen 50 is configured by including a system configuration feature area 51, a generated proposed system configuration list area 52, and a system configuration display area 53.

Then, in the system configuration feature area 51, the features, which the system configuration proposing apparatus 3 extracted from the configuration generation conditions provided by the client 2, of the data analysis task system which the relevant customer intends to construct on the cloud are displayed in natural language in bullet points.

Moreover, in the generated proposed system configuration list area 52, the overview of respective proposed system configurations generated by the system configuration proposing apparatus 3 under such configuration generation conditions are displayed in a list. Specifically, in the generated proposed system configuration list area 52, identification number of each proposed system configuration ("Configuration No."), generation time of day ("Generation Time of Day"), the suitability for the customer's requirements ("Suitability"), the service categories of the respective service constituent elements 16 (FIG. 2) constituting the proposed system configuration ("Service Constituent Elements"), the names of these respective cloud services used for these service constituent elements 16 ("Names of Services To Be Used"), a fee per unit time when using the data analysis task system ("Cost"), and application achievements of the analysis catalog 15 (FIG. 2) which is the basis of the system configuration of the proposed system configuration ("Catalog Application Achievements") are displayed in a list. Under this circumstance, such respective proposed system configurations are displayed in descending order of the suitability.

Moreover, in the generated proposed system configuration list area 52, a display button 52A is displayed corresponding to each proposed system configuration displayed in a list. Then, by clicking on this display button 52A, a configuration diagram (hereinafter referred to as a "System Configuration Diagram") 53A of the system configuration based on that proposed system configuration is displayed in the system configuration display area 53.

In this system configuration FIG. 53A, boxes 53AX respectively corresponding to the service constituent elements 16 constituting the system are displayed in a form connected with lines according to the flow of processing. Then, each box 53AX displays the name of each cloud service to be used for the relevant service constituent element 16.

(3-3) Application Result Registration Screen

Figure 10:
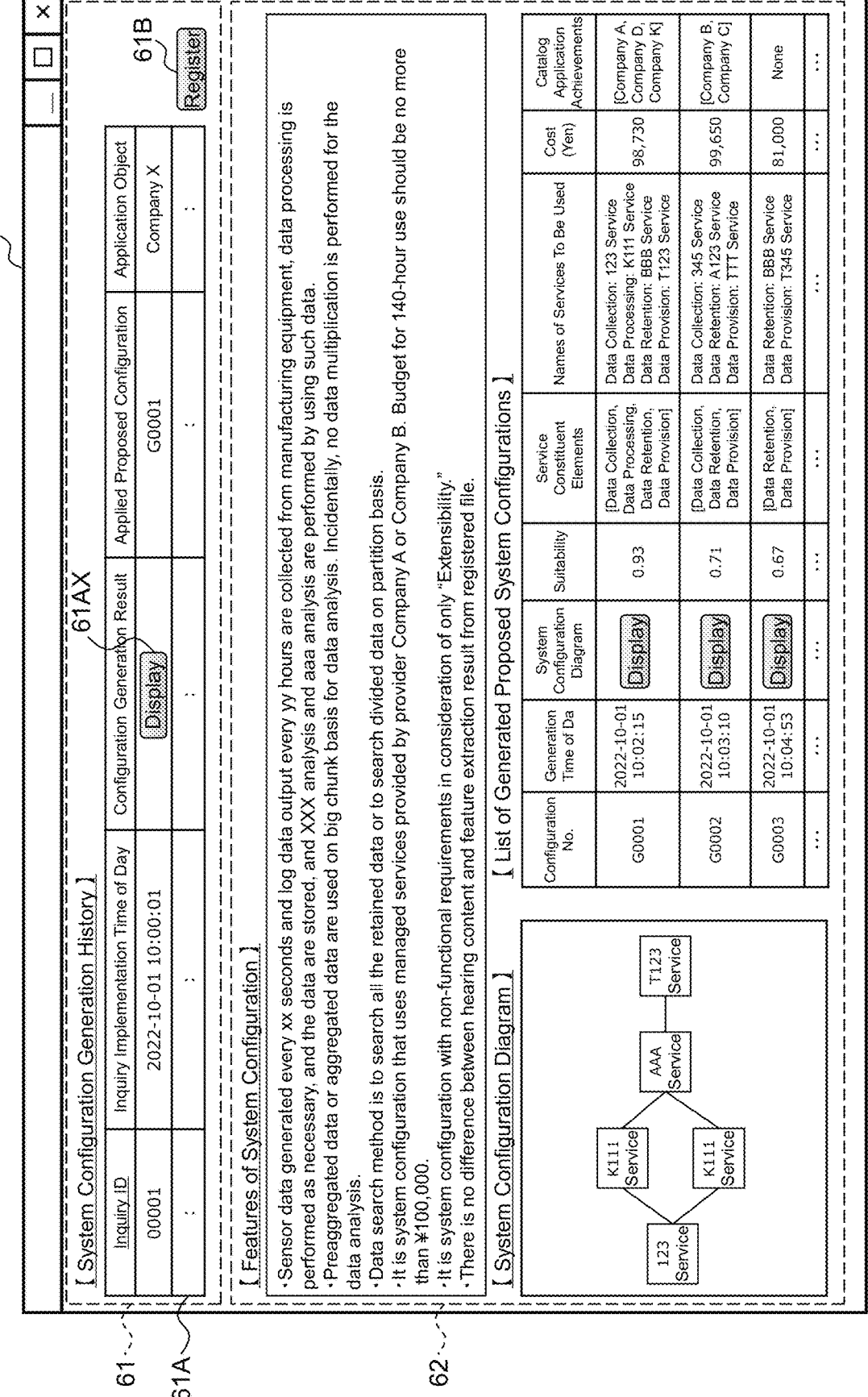
FIG. 10 is a diagram illustrating a configuration example of an application result registration screen.

On the other hand, FIG. 10 shows a configuration example of the application result registration screen 60 displayed according to the aforementioned application result registration screen display instruction that is transmitted from the system configuration proposing apparatus 3 to the client 2 of the user at a predetermined timing after the system configuration proposing apparatus 3 presents the proposed system configuration to the user.

This application result registration screen 60: is a screen for inquiring of the user, to whom the system configuration proposing apparatus 3 presented the proposed system configuration, about which proposed system configuration of the presented proposed system configurations has been applied; and is configured by including a system configuration generation history area 61 and a configuration generation result display area 62.

Then, in the system configuration generation history area 61, a generation history of the proposed system configurations which have been generated by the system configuration proposing apparatus 3 in response to the inquiries from the relevant user is displayed in a list. Specifically, in the system configuration generation history area 61, regarding each inquiry that the user made on the system configuration proposing apparatus 3, identification information assigned to the inquiry ("Inquiry ID"), the time of day when the inquiry was made ("Inquiry Implementation Time of Day"), identification information of the proposed system configuration applied by the user from among the proposed system configurations proposed by the system configuration proposing apparatus 3 ("Applied Proposed Configuration"), and a customer name of a customer to whom the proposed system configuration was applied ("Application Object") are displayed in a table. This table will be hereinafter referred to as a system configuration generation history table 61A.

Incidentally, the identification information of the proposed system configuration applied by the user among the proposed system configurations proposed by the system configuration proposing apparatus 3 is not displayed when the user has not yet registered the proposed system configuration. Specifically speaking, in this case, the column "Applied Proposed Configuration" in the system configuration generation history table 61A of FIG. 10 is left blank.

Moreover, in the system configuration generation history area 61, a display button 61AX is displayed corresponding to each inquiry made by the user to the system configuration proposing apparatus 3 is displayed. Then, when this display button 61AX is clicked, the content similar to the content displayed in the system configuration feature area 51, the generated proposed system configuration list area 52, and the system configuration display area 53 of the configuration generation result display screen 50 (FIG. 9) displayed on the client 2 for the relevant inquiry in the past is displayed in the configuration generation result display area 62.

Consequently, the user can confirm the identification number ("Configuration No.") of the proposed system configuration applied at that time regarding an inquiry for which the proposed system configuration applied by the user from among the proposed system configurations proposed by the system configuration proposing apparatus 3 has not been registered (hereinafter referred to as an "unregistered proposed application configuration inquiry").

Therefore, regarding the unregistered proposed application configuration inquiry, the user can confirm the identification number of the proposed system configuration applied at the time as described above and can register the proposed system configuration applied by the user for the unregistered proposed application configuration inquiry by clicking a register button 61B after entering the identification number in the "Applied Proposed Configuration" column of a record corresponding to the unregistered proposed application configuration inquiry in the system configuration generation history table 61A displayed in the system configuration generation history area 61. In this case, this information is reported from the client 2 to the system configuration proposing apparatus 3 and is registered in the applied proposed configuration column 25H (FIG. 4) and the application object column 25I (FIG. 4) of the inquiry history database 25 (FIG. 4), and the time and date of that time point is stored in the proposed configuration application result date and time column 25G.

(4) Various Kinds of Processing Relating to System Configuration Proposing Function Next, an explanation will be provided about the specific processing content of various kinds of processing executed at the system configuration proposing apparatus 3 in association with the system configuration proposing function of this embodiment. In the following explanation, a processing subject of each processing will be explained as a program ("XX unit"); however, it is needless to say that the CPU 11 (FIG. 1) is actually the one that executes the processing according to that program.

(4-1) System Configuration Proposing Processing

Figure 11:
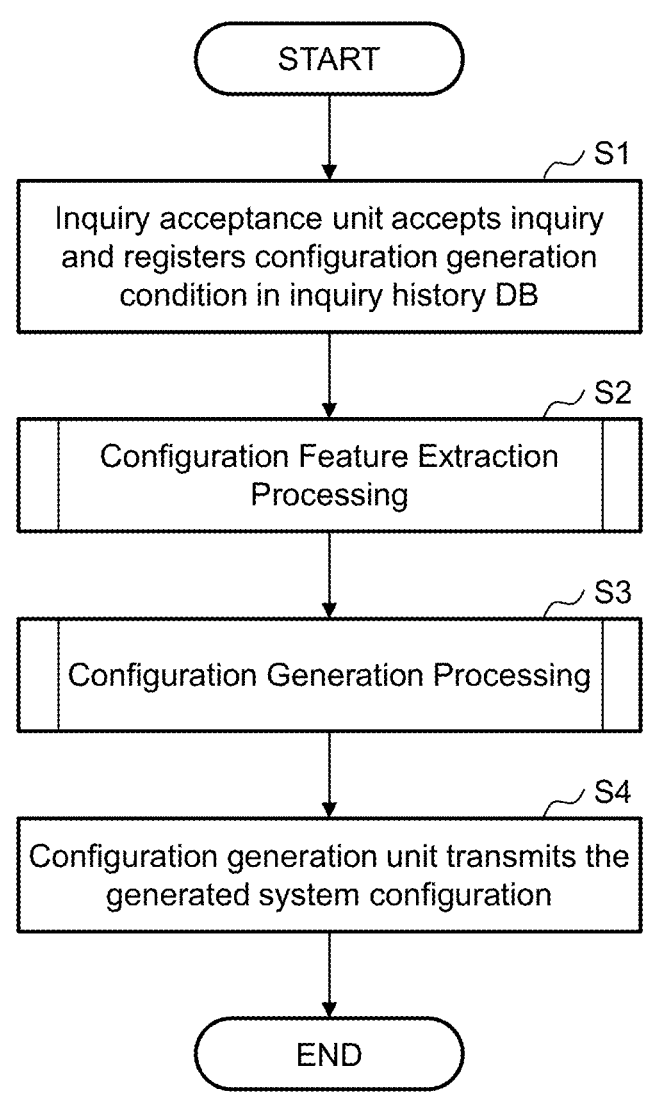
FIG. 11 is a flowchart illustrating a processing sequence for system configuration generation processing.

FIG. 11 illustrates a flow of a series of processing (hereinafter referred to as "system configuration proposing processing") executed by the system configuration proposing apparatus 3 which has received the aforementioned system configuration generation request transmitted from the client 2. The system configuration proposing apparatus 3 generates a proposed system configuration which satisfies the configuration generation conditions included in the received system configuration generation request in accordance with the processing sequence illustrated in this FIG. 11 and transmits the generation result to the client 2.

Practically, when the system configuration proposing apparatus 3 receives the system configuration generation request, the system configuration proposing processing illustrated in this FIG. 11 is started. Then, the inquiry acceptance unit 28 (FIG. 1) firstly accepts the system configuration generation request and registers the configuration generation conditions, which are included in the accepted system configuration generation request, in the inquiry history database 25 (FIG. 4) (S1).

Specifically, the inquiry acceptance unit 28 secures an unused record in the inquiry history database 25 and stores a new log ID assigned to the system configuration generation request in the log ID column 25A (FIG. 4) of that record. Moreover, the inquiry acceptance unit 28 stores the user ID of the user who has transmitted the system configuration generation request in the user ID column 25B (FIG. 4) of that record, and also stores the current date and time in the inquiry implementation date and time column 25C (FIG. 4) of that record.

Furthermore, the inquiry acceptance unit 28 files the information of the configuration generation conditions received at that time and stores it in the auxiliary storage apparatus 13 (FIG. 1) as the configuration generation condition file FL1 (FIG. 5(A)), and also stores the pathname of the path to the configuration generation condition file FL1 in the configuration generation condition column 25D (FIG. 4) of that record. Then, the inquiry acceptance unit 28 then evokes the configuration feature extraction unit 29.

After being evoked by the inquiry acceptance unit 28, the configuration feature extraction unit 29 reads the configuration generation condition file FL1 on the path whose pathname is stored in the inquiry history database 25.

Moreover, the configuration feature extraction unit 29 executes the configuration feature extraction processing for extracting the features of the system configuration of the data analysis task system to be then constructed from the configuration generation conditions recorded in the read configuration generation condition file FL1 (S2).

Specifically, the configuration feature extraction unit 29 extracts, from the configuration generation conditions recorded in the configuration generation condition file FL1, the data structure(s) of the data to be handled by the data analysis task system, the data search method(s), the data analysis method(s), the data handling basis/bases, and the non-functional requirement(s) as the features of the system configuration of the data analysis task system requested by the customer.

Then, the configuration feature extraction unit 29 files the information of the extracted features and stores it in the auxiliary storage apparatus 13 as the feature extraction result file FL2 (FIG. 5(B)) and also stores the pathname of the path to the feature extraction result file FL2 in the feature extraction result column 25E (FIG. 4) of the record secured in step S1. Moreover, the configuration feature extraction unit 29 then evokes the configuration generation unit 30 (FIG. 1).

After being evoked by the configuration feature extraction unit 29, the configuration generation unit 30 reads the feature extraction result file FL2 on the path whose pathname is stored in the relevant feature extraction result column 25E in the inquiry history database 25. Moreover, the configuration generation unit 30 generates all the proposed system configurations which satisfy the features recorded in the feature extraction result file FL2 and also executes the configuration generation processing for calculating the suitability of each of these proposed system configurations (S3).

Under this circumstance, the configuration generation unit 30 files the information of the suitability of the generated and calculated proposed system configuration and stores it in the auxiliary storage apparatus 13 as the configuration generation result file FL3 (FIG. 5(C)). Moreover, the configuration generation unit 30 stores the pathname of the path to the configuration generation result file FL3 in the configuration generation result column 25F (FIG. 4) of the record secured in step S1.

Furthermore, the configuration generation unit 30 sequentially transmits each of the generated and calculated proposed system configurations and its suitability to the configuration generation result display unit 21 (FIG. 1) of the client 2 via the network interface and the network (S4). Consequently, the configuration generation result display screen 50 described earlier with reference to FIG. 9 based on these proposed system configurations and their suitability. As a result, the system configuration proposing processing is terminated.

(4-2) Configuration Feature Extraction Processing

FIG. 12 shows the specific processing content of the configuration feature extraction processing executed by the configuration feature extraction unit 29 (FIG. 1) in step S2 of the system configuration proposing processing (FIG. 11). The configuration feature extraction unit 29 extracts the features of the system configuration of the data analysis task system, which the customer intends to construct on the cloud, in accordance with the processing sequence illustrated in FIG. 12.

Practically, the configuration feature extraction unit 29 firstly extracts, from among the configuration generation conditions recorded in the configuration generation condition file FL1 (FIG. 5(A)) on the path whose pathname is stored in the inquiry history database 25, the data structure(s) of the data to be handled by the data analysis task system, which the customer intends to construct on the cloud, the data handling basis/bases, the data search method(s), and the data analysis method(s), by performing existing natural language processing such as morphological analysis, syntactic analysis, semantic analysis, and context analysis for the task overview entered in natural language in the task overview text box 41A of the task overview area 41 on the configuration generation condition setting screen 40 described earlier with reference to FIG. 8 (S10).

Subsequently, the configuration feature extraction unit 29 extracts, from among the configuration generation conditions recorded in the configuration generation condition file FL1, the data structure(s) of the data to be handled by the data analysis task system, which the customer intends to construct on the cloud, the data handling basis/bases, the data search method(s), and the data analysis method(s), which are selected respectively in the check boxes 42B, 43B, 44B, and 45B in the data structure setting area 42 (FIG. 8), the data search method setting area 43 (FIG. 8), the data analysis method setting area 44 (FIG. 8), and the data handling basis setting area 45 (FIG. 8) of the configuration generation condition setting screen 40 (S11).

Next, if a file is designated in the registered file designating area 46 of the configuration generation condition setting screen 40, the configuration feature extraction unit 29 extracts the data structure(s) of the data to be handled by the data analysis task system experimentally produced by the customer, the data handling basis/bases, the data search method(s), and the data analysis method(s), respectively, from the data of the file transmitted from the client 2 as the configuration generation conditions (S12).

Incidentally, the purpose of extracting the data structure(s), etc., of the data to be handled by the data analysis task system, which the customer intends to construct on the cloud, from the registered file in this way is to make sure that, for example, the trial execution result of PoC (Proof of Concept) can be added as a feature value when generating the proposed system configuration and that there is no difference between the content extracted in step S10 and that in step S11.

For example, if the file designated by the user is an SQL log file, the configuration feature extraction unit 29 extracts the data search method by combining the data search method extracted in step S10 and the data search method extracted in step S11 and thereby narrowing down the conditional phrase part. Moreover, if the file designated by the user is a test data file, the configuration feature extraction unit 29 extracts the information about the data structure such as the data form, whether the data is repeated or not, and whether the data is in chronological order or not.

Subsequently, the configuration feature extraction unit 29 extracts, from among the configuration generation conditions recorded in the configuration generation condition file FL1, the setting content of various respective non-functional requirements, which are selected in the non-functional requirements setting area 47 (FIG. 8) on the configuration generation condition setting screen 40, of the data analysis task system that the customer intends to construct on the cloud (S13).

Next, the configuration feature extraction unit 29 files each piece of information of the data structure, the data structure(s), the data handling basis/bases, the data search method(s), and the data analysis method(s), and the non-functional requirement(s) of the data to be handled extracted in step S10 to step S13 about the data analysis task system, which the customer intends to construct on the cloud, and stores it in the auxiliary storage apparatus 13 (FIG. 1) as the feature extraction result file FL2 (FIG. 5(B)), and also stores the pathname of the path to the feature extraction result file FL2 in the feature extraction result column 25E (FIG. 4) of the relevant record in the inquiry history database 25 (FIG. 4) (S14). Then, the configuration feature extraction unit 29 terminates the configuration feature extraction processing and evokes the configuration generation unit 30.

(4-3) Configuration Generation Processing (4-3-1) Main Processing

Figure 13B:
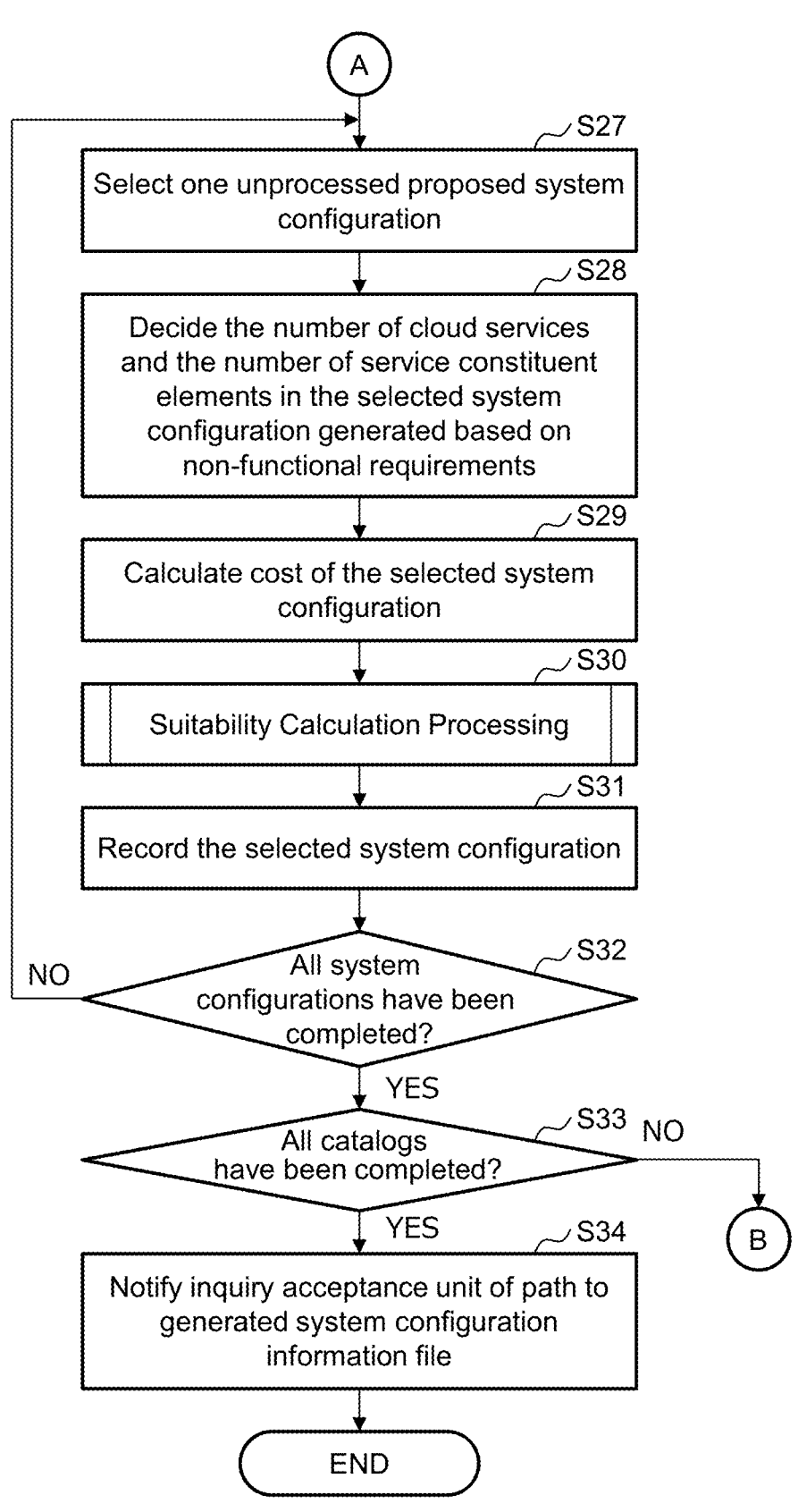
FIG. 13B is a flowchart illustrating a processing sequence for configuration generation processing.

FIG. 13A and FIG. 13B illustrate the specific processing content of the configuration generation processing executed by the configuration generation unit 30 (FIG. 1) in step S3 of the system configuration generation processing (FIG. 11). The configuration generation unit 30 generates the proposed system configurations of the data analysis task system having the features extracted by the configuration feature extraction unit 29 in accordance with the processing sequence illustrated in FIG. 13A and FIG. 13B.

Practically, after being evoked by the configuration feature extraction unit 29, the configuration generation unit 30 starts the configuration generation processing illustrated in FIG. 13A and FIG. 13B. Then, the configuration generation unit 30 firstly reads the pathname of the path to the relevant feature extraction result file FL2 from the inquiry history database 25 (FIG. 4) and also reads the feature extraction result file FL2 on the path from the auxiliary storage apparatus 13 (S20).

Subsequently, the configuration generation unit 30 extracts, from the analysis catalog database 26 (FIG. 6), all the analysis catalogs 15 (FIG. 2) including at least one of the features extracted from the read feature extraction file FL2 by the configuration feature extraction unit 29 (S21).

Specifically, if the content of the feature extraction file FL2 is, for example, as illustrated in FIG. 5(B), the "XXX Analysis" and the "aaa Analysis" are included as the data analysis methods in the features extracted by the configuration feature extraction unit 29, so that the configuration generation unit 30 extracts all the analysis catalogs 15 in which at least either of "XXX Analysis" or "aaa Analysis" is stored in the analysis method column 26E of the analysis catalog database 26 (FIG. 6). Therefore, in the example of FIG. 6, at least the respective analysis catalogs 15 with the catalog IDs "K0001," "K0002," and "K0003" are extracted.

Similarly, if the features extracted by the configuration feature extraction unit 29 include the service categories "Data Collection," "Data Processing," "Data Storage," and "Data Provision" (for example, see the task overview column 41 in FIG. 8), all the analysis catalogs 15 in which at least one of "Data Collection," "Data Processing," "Data Storage (Data Retention)" and "Data Provision" is stored in the service constituent element column 26G of the analysis catalog database 26 (FIG. 6) are extracted. Therefore, in the example of FIG. 6, at least the respective analysis catalogs 15 with the catalog IDs "K0001," "K0002," "K0003," and "K0004" are extracted.

Next, the configuration generation unit 30 selects one analysis catalog 15 in which step S23 and subsequent steps have not been processed yet from the analysis catalogs 15 extracted in step S21 (S22). Moreover, the configuration generation unit 30 selects one service constituent element 16 in which step S24 and subsequent steps have not been processed yet from the service constituent elements 16 (FIG. 2) in the analysis catalog 15 selected in step S22 (hereinafter referred to as a "selected analysis catalog") (S23).

Then, the configuration generation unit 30 extracts, from the cloud service database 27 (FIG. 7), an available cloud service which matches the service category (such as the data collection, the data processing, the data retention, or the data provision) of the service constituent element 16 selected in step S23 (hereinafter referred to as a "selected service constituent element") and whose data category matches the extraction result of the relevant feature (the data structure, the data search method, the data analysis method, or the data handling basis) extracted by the configuration feature extraction unit 29 (S24).

Figure 2A:
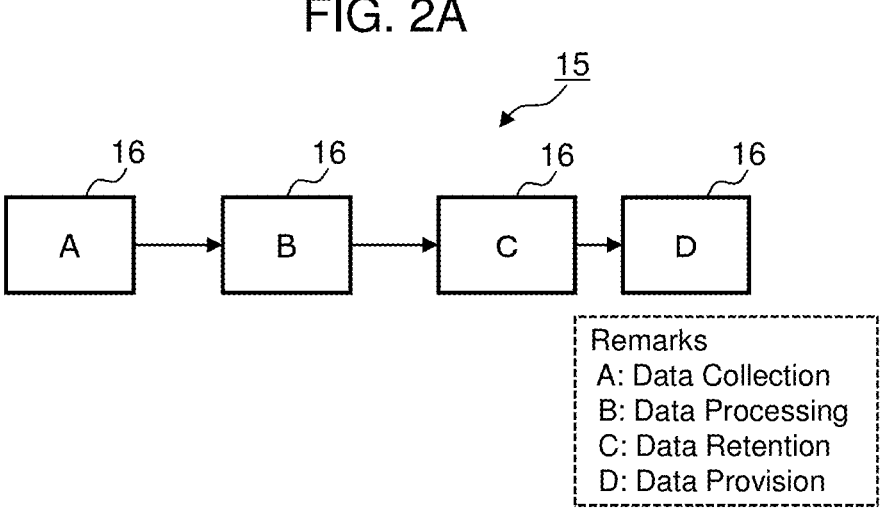
FIG. 2(A) and FIG. 2(B) are conceptual diagrams for explaining analysis catalogs.

For example, let us assume that the selected analysis catalog 15 at that time is the analysis catalog of the processing flow illustrated in FIG. 2(A) and the selected service constituent element 16 at that time is the service constituent element "C." Moreover, let us assume that the data handling bases of the data analysis task system, which the customer intends to construct on the cloud, are "Big Chunk," "Pre-aggregated," "Aggregated," and the "No Multiplication" as illustrated in FIG. 5(A) and the outline of each cloud service stored in the cloud service database 27 is as illustrated in FIG. 7.

In this case, since the service category of the service constituent element 16 "C" in FIG. 2 which is the selected service constituent element 16 is "Data Retention," the configuration generation unit 30 extracts all the service constituent elements 16 in which the service category is "Data Retention" and the "Data Handling Bases" are "Big Chunk," "Preaggregated," and "Aggregated" (and "No Multiplication") from the cloud services registered in the cloud service database 27. In the example of FIG. 7, the cloud service with the service ID "H0002" is a cloud service which satisfies these requirements within the range described in FIG. 7, so that at least the cloud service "H0002" is extracted in step S24 in this example.

Next, the configuration generation unit 30 judges whether or not it has finished extracting the relevant cloud services for all the service constituent elements 16 of the selected analysis catalog 15 (S25). Then, if the configuration generation unit 30 obtains a negative result in this judgment, it returns to step S23 and then repeats processing from step S23 to step S25 by sequentially switching the service constituent element 16 selected in step S23 to another service constituent element 16 regarding which step S24 has not been processed.

Then, when the configuration generation unit 30 eventually obtains an affirmative result in step S25 by finishing extracting applicable cloud services with respect to all the service constituent elements 16 of the selected analysis catalog 15, it generates all the system configurations that can be constructed by combining the respective cloud services extracted for each service constituent element 16 of the selected analysis catalog 15 (S26).

Subsequently, the configuration generation unit 30 selects one system configuration in which step S28 and subsequent steps have not been processed yet from the system configurations generated in step S26 (S27). Then, the configuration generation unit 30 calculates the suitability of the system configuration selected in step S27 (hereinafter referred to as a "selected system configuration") by the following processing in step S28 to step S30.

Specifically, based on the non-functional requirements among the features, which were obtained in step S20, of the data analysis task system to be constructed, the configuration generation unit 30 firstly determines the number of service constituent elements 16 (FIG. 2) of each data category in the selected system configuration (S28).

For example, if the availability is "Necessary," the configuration generation unit 30 determines the number of cloud services applied to the service constituent element 16 of each service category to be two or more in preparation for a failure. Moreover, if the extensibility is "Necessary," the configuration generation unit 30 determines: the number the service constituent elements 16 of the service category of "Data Processing" to be two although they will not be used at the beginning (the cloud service will not be applied); and then determines the number of the service constituent elements 16 of other service categories to be one.

Subsequently, the configuration generation unit 30 calculates the cost of constructing and using the data analysis task system having the selected system configuration (S29).

Specifically, the configuration generation unit 30 obtains the fee per unit time of each cloud service applied to each service constituent element 16 in the selected system configuration from the cloud service database 27 (FIG. 7) and calculates the usage fee per unit time of the data analysis task system of the selected system configuration by aggregating the fees obtained above. Moreover, by referring to the configuration generation condition column 25D (FIG. 4) of the relevant record in the inquiry history database 25 (FIG. 4), the configuration generation unit 30 reads the pathname of the path to the configuration generation condition file FL1, in which the configuration generation conditions are stored, and reads the configuration generation condition file FL1.

Then, the configuration generation unit 30 reads the usage time recorded in the configuration condition generation file (the usage time set in the non-functional requirements setting area 47 of the configuration generation condition setting screen 40 in FIG. 8) and calculates the total cost of constructing and using the data analysis task system of the selected system configuration by multiplying the usage time by the usage fee per unit time of the data analysis task system of the selected system configuration calculated as described above.

Next, the configuration generation unit 30 calculates the suitability of the selected system configuration with respect to the configuration generation conditions set by the customer on the basis of the number of cloud services and the number of service constituent elements conditions determined in step S28 and the cost calculated in step S29 (S30). The flow of the specific processing of the configuration generation unit 30 in step S30 (hereinafter referred to as "suitability calculation processing") will be described later.

Then, the configuration generation unit 30 records various kinds of information, including the number of cloud services and the number of service constituent elements determined in step S28, the cost calculated in step S29, and the suitability calculated in step S30, which are displayed regarding the selected system configuration on the configuration generation result display screen 50 described above with respect to FIG. 9, in the configuration generation result file FL3 as detailed information of one proposed system configuration. Moreover, the configuration generation unit 30 stores the pathname of the path to the configuration generation result file FL3 in the configuration generation result column 25F (FIG. 4) of the relevant record in the inquiry history database 25 (FIG. 4). Incidentally, in step S31 of the second time and subsequent times, the configuration generation unit 30 records various kinds of information, which are displayed about the selected system configuration in the aforementioned configuration generation result display screen 50 (FIG. 9), in the configuration generation result file FL3 (S31).

Subsequently, the configuration generation unit 30 judges whether or not the execution of the processing of step S27 to step S31 has been completed with respect to all the system configurations generated in step S26 (S32). Then, if the configuration generation unit 30 obtains a negative result in this judgment, it returns to step S27 and then repeats processing from step S27 to step S32 by sequentially switching the system configuration to be selected in step S27 to another system configuration regarding which S28 and subsequent steps have not been processed. By the iterative processing, the necessary information about each system configuration generated in step S26 is sequentially recorded in the configuration generation result file FL3 as detailed information of each proposed system configuration.

Then, if the configuration generation unit 30 eventually obtains an affirmative result in step S32 by completing the processing from step S27 to step 31 with respect to all the system configurations generated in step S26, it judges whether or not the processing in step S23 to step S32 has been completed for all the analysis catalogs 15 extracted in step S21 (S33).

Then, if the configuration generation unit 30 obtains a negative result in this judgment, it returns to step S22 and then repeats processing from step S22 to step S33 by sequentially switching the analysis catalog 15 to be selected in step S22 to another analysis catalog 15 regarding which S23 and subsequent steps have not been processed.

Then, if the configuration generation unit 30 eventually obtains an affirmative result in step S33 by completing the processing from step S23 to step S32 with respect to all the analysis catalogs 15 extracted in step S21, it notifies the inquiry acceptance unit 28 (FIG. 1) of the pathname of the path to the configuration generation result file FL3 generated as described above (S34) and then completes the configuration generation processing.

Incidentally, the inquiry acceptance unit 28 which has been notified of the pathname of the path to the configuration generation result file FL3 by the configuration generation unit 30 reads the configuration generation result file FL3 from the auxiliary storage apparatus 13 (FIG. 1) and transmits it to the client 2 which made the relevant inquiry through the network interface 14 (FIG. 1) and the network 4 (FIG. 1) sequentially.

As a result, based on the information recorded in the configuration generation result file FL3, the configuration generation result display screen 50 described earlier with respect to FIG. 9 is displayed on the client 2.

(4-3-2) Suitability Calculation Processing

Figure 14:
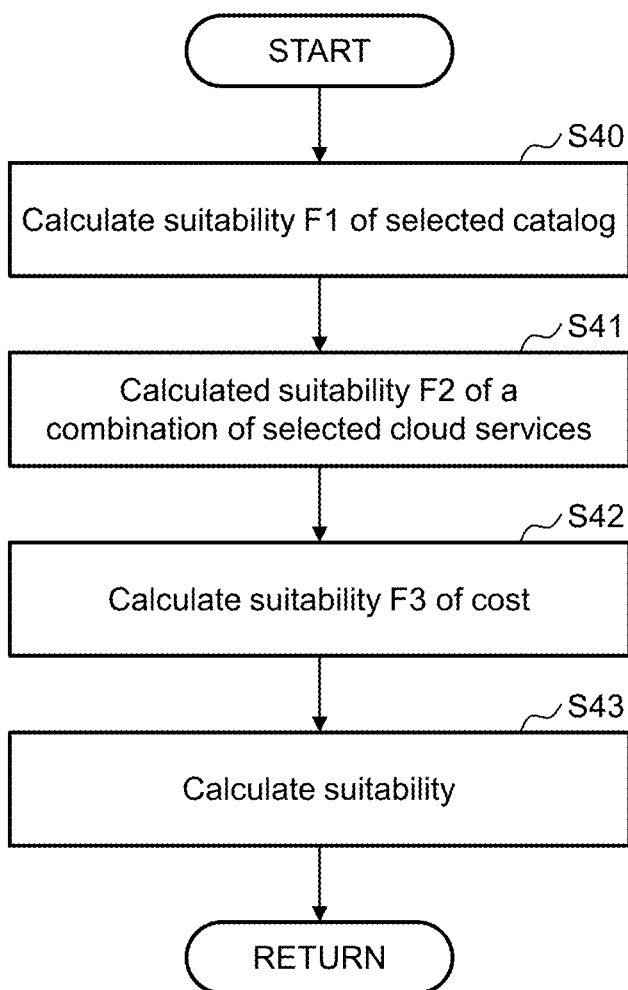
FIG. 14 is a flowchart illustrating a processing sequence for suitability calculation processing.

FIG. 14 illustrates a specific processing flow of the suitability calculation processing executed by the configuration generation unit 30 in step S30 of the aforementioned configuration generation processing.

Now, the suitability F of the selected system configuration is calculated according to the following equation, where F1 represents the suitability of the selected analysis catalog 15 itself, F2 represents the suitability of the combination of the cloud services applied to each service constituent element 16 (FIG. 2), and F3 represents the suitability of the cost.

[Math. 1]

$$F=(F1+F2+F3)/\text{The Number of Evaluation Items} \qquad (1)$$

Moreover, since there are three evaluation items F1 to F3 in this example, the number of evaluation items in Expression (1) is three. Therefore, in this example, the suitability F is calculated within the range of 0 to 1, and the closer the suitability F is to 1, the higher the suitability becomes.

When the processing proceeds to step S30 of the configuration generation processing, the configuration generation unit 30 starts the suitability calculation processing illustrated in FIG. 14 and firstly calculates the suitability F1 of the selected analysis catalog 15 itself at that time (S40). Specifically, the configuration generation unit 30 calculates the suitability F1 of the selected analysis catalog 15 itself by the following expression.

[Math. 2]

$$F1 = \left\{ \frac{\text{(The Number of Matches Between Analysis Methods in Analysis Catalog)}}{\text{(The Number of Elements of Analysis Methods)}} + \frac{\text{(The Number of Matches Between Service Constituent Elements)}}{\text{(The Number of Service Constituent Elements)}} \right\} \div 2 \quad (2)$$

Here, the denominator of the first term in parentheses on the right-hand side of Expression (2) is the number of elements of the analysis methods requested by the customer, and the numerator of the first term is the number of matches between the analysis method requested by the customer for each analysis method of the selected analysis catalog 15. Moreover, the denominator of the second term in the parentheses is the number of service constituent elements 16 requested by the customer, and the numerator of the second term is the number of matches between the respective service constituent elements of the selected analysis catalog 15 and the respective service constituent elements 16 requested by the customer.

For example, let us assume that the features, which are extracted by the configuration feature extraction unit 29, of the data analysis task system which the customer intends to construct on the cloud are as illustrated in FIG. 15, and the content of each analysis catalog 15 stored in the analysis catalog database 26 is as illustrated in FIG. 6.

In this case, if the selected analysis catalog 15 is "K0001," the denominator of the first term in parentheses in Expression (2) is "2" because two analysis methods "xxx Analysis" and "aaa Analysis" are requested by the customer, as is apparent in FIG. 15. Since the analysis methods of the selected analysis catalog 15 are "xxx Analysis" and "aaa Analysis" (see FIG. 6), these analysis methods and the analysis methods requested by the customer are "xxx Analysis" and "aaa Analysis" and match each other. Therefore, the numerator of the first term in expression (2) is also "2."

Moreover, the denominator of the second term in parentheses in Expression (2) is "3" because three service constituent elements 16 "Aggregation," "Data Processing," and "Data Storage" are requested by the customer, as is apparent in FIG. 15 (See FIG. 6). Moreover, since the service constituent elements 16 of the selected analysis catalog 15 are "Data Collection," "Data Processing," "Data Retention," and "Data Provision" (see FIG. 6), these service constituent elements and the service constituent elements 16 requested by the customer are "Aggregation," "Data Processing," and "Data Storage" and all three of them match each other. Therefore, the numerator of the second term in parentheses in Expression (2) is also "3."

Therefore, in this example, the suitability F1 of the selected analysis catalog itself is calculated as "1" as illustrated in the following expression.

[Math. 3]

$$F1 = \left( \frac{2}{2} + \frac{3}{3} \right) \div 2 = 1 \quad (3)$$

Subsequently, the configuration generation unit 30 calculates the suitability F2 of the combination of these cloud services that are respectively applied to the respective service constituent elements 16 of the selected analysis catalog 15 (S41). Specifically, the configuration generation unit calculates points P for each cloud service that is respectively applied to each service constituent element 16 of the selected analysis catalog 15 by the following expression, and calculates the suitability F2 of the combination of the cloud services by dividing the total sum of points P calculated by Expression (4) of the respective service constituent elements 16 of the selected analysis catalog 15 by the number of the service constituent elements 16 constituting the selected analysis catalog 15 as in the expression below.

[Math. 4]

$$P = \left\{ \frac{\text{(The Number of Matches Between Data Structures)}}{\text{(The Number of Elements of Data Structure(s))}} + \frac{\text{(The Number of Matches Between Data Handling Bases)}}{\text{(The Number of Elmements of Data Handling Basis/Bases)}} + \frac{\text{(The Number of Matches Between Data Search Methods)}}{\text{(The Number of Elmements of Data Search Method(s))}} \right\} \div 3 \quad (4)$$

[Math. 5]

$$F2 = \frac{\text{(Total Sum of Points } P \text{ of Respective Service Consituent Elements Constituting Selected Analysis Catalog)}}{\text{The Number of Service Constituent Elements Constituting Selected Analysis Catalog}} \quad (5)$$

Here, the denominator of the first term in parentheses on the right-hand side in Expression (4) is the number of elements of the data structure(s) requested by the customer, and the numerator of the first term is the number of matches between the data structure(s) of the selected service constituent element 16 and the data structure(s) requested by the customer. Moreover, the denominator of the second term in the parentheses is the number of elements of the data handling basis/bases requested by the customer, and the numerator of the second term is the number of matches between the data handling basis/bases of the selected service constituent element 16 and the data handling basis/bases requested by the customer. Furthermore, the numerator of the third term in the parentheses is the number of elements of the data search method(s) requested by the customer, and the numerator of the third term is the number of matches between the data search method(s) of the selected service constituent element 16 and the data search method(s) requested by the customer.

For example, let us assume that the features, which are extracted by the configuration feature extraction unit 29, of the data analysis task system which the customer intends to construct on the cloud are as illustrated in FIG. 15 and that the cloud service applied to a certain service constituent element 16 constituting the selected system configuration is a cloud service with the service ID "H0001" in FIG. 7.

In this case, the denominator of the first term in parentheses in Expression (4) is one of the three "Chronological Order," "Sensor Data" and "Log Data" as in "sensor data generated every xx seconds" and "log data output every yy hours" as requested by the customer, as is apparent in FIG. 15. Moreover, since the data structures of the cloud service are also "Chronological Order," "Log," and "Sensor Data" (see FIG. 6), these data structures and those requested by the customer are "Chronological Order," "Log" and "Sensor Data" and match each other.

Moreover, the denominator of the second term in parentheses in Expression (4) is "2" because the data handling bases requested by the customer are "Preaggregated" and "Big Chunk," as is apparent in FIG. 15. Moreover, since the data handling bases of the relevant cloud service are "Fragmented" and "Preaggregated" (see FIG. 6), these data handling bases and the data handling bases requested by the customer match each other with respect to "Preaggregated" only. Therefore, the numerator of the second term in parentheses of Expression (4) is "1."

Furthermore, the denominator of the third term in parentheses of Expression (4) is "2" because the data search methods requested by the customer are "All Access" and "Searching Data Divided in Partitions (Partition Access)," as is apparent in FIG. 15. Moreover, since the data search method of such cloud service is "All Access" (see FIG. 6), this search method and the data search methods requested by the customer match each other with respect to "All Access" only. Therefore, the numerator in parentheses of Expression (4) is "1."

Therefore, in this example, the points P of the cloud service applied to the service constituent element 16 of the selected analysis catalog is calculated as "0.67" as in the following expression.

[Math. 6]

$$P = \left(\frac{3}{3} + \frac{1}{2} + \frac{1}{2}\right) \div 3 = 0.67 \quad (6)$$

Figure 2B:
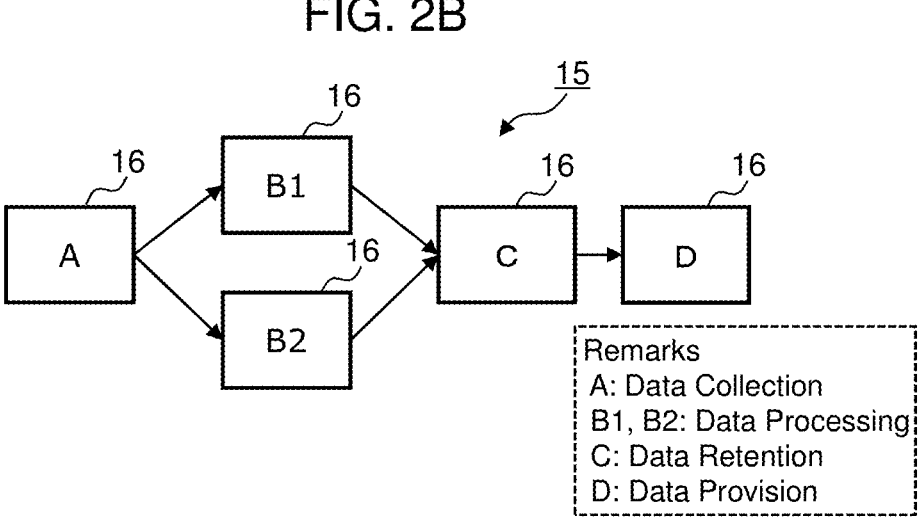

Then, the configuration generation unit 30 calculates the points P for the respective cloud services that are respectively applied to the respective service constituent elements 16 constituting the selected analysis catalog 15 in the same manner as described above and calculates the suitability F2 of the combination of the cloud services by dividing the total sum of the points P by the number of service constituent elements 16 constituting the selected analysis catalog 15 as in Expression (5) (for example, "5" in the example of FIG. 2(B)).

Next, the configuration generation unit 30 calculates the suitability F3 of the cost (S42). Specifically, the configuration generation unit 30 calculates the suitability F3 by the following expression.

[Math. 7]

F3=(Operable Time)/(Desired Operating Time)
={Budget÷(Total Charge Amount of Service Constituent Elements Constituting Analysis Catalog)}÷(Desired Operating Time)  (7)

Incidentally, in Expression (7), the suitability F3 exceeds "1" when the operable time is more than the desired operating time and, therefore, the suitability F3 is treated as "1" in this case (the upper limit of the suitability F3 is "1").

Subsequently, the configuration generation unit 30 calculates the suitability F of the selected system configuration according to the aforementioned Expression (1) by using the suitability F1 calculated in step S40, the suitability F2 calculated in step S41, and the suitability F3 calculated in step S42 (S43). Then, the configuration generation unit 30 terminates this suitability calculation processing and returns to the configuration generation processing in FIG. 13A and FIG. 13B.

(4-4) Application Result Registration Processing

Figure 16:
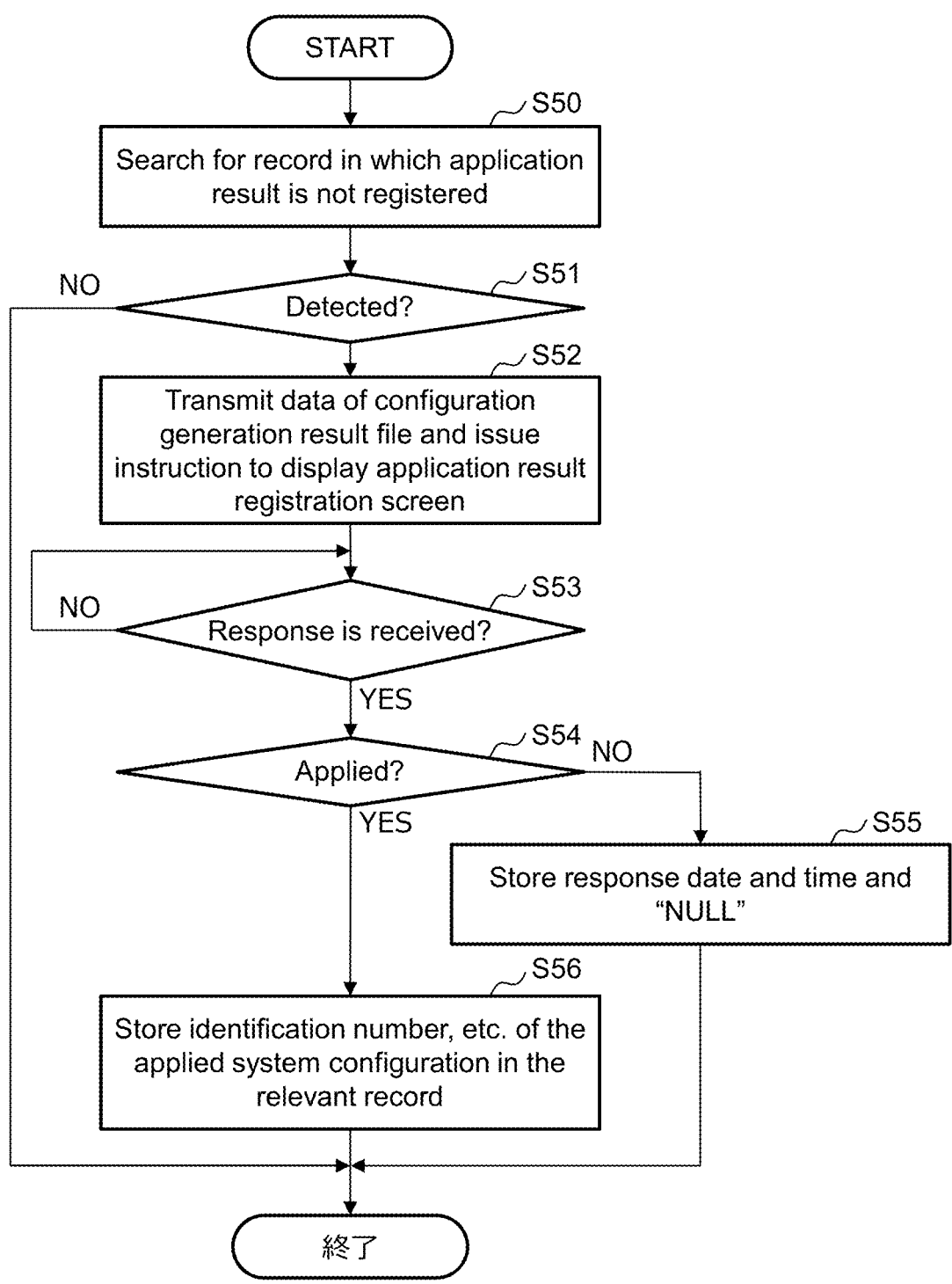
FIG. 16 is a flowchart illustrating a processing sequence for application result registration processing.

On the other hand, FIG. 16 illustrates a processing sequence for the application result registration processing which is regularly executed by the application result registration unit 31 (FIG. 1). The application result registration unit 31 inquires of the user, who transmitted the aforementioned system configuration generation request, about whether the proposed system configuration proposed by the system configuration proposing apparatus 3 has been applied or not, in accordance with the processing sequence illustrated in this FIG. 16 and registers the result in the inquiry history database 25 (FIG. 4).

Practically, the application result registration unit 31 regularly starts the application result registration processing in this FIG. 16 and firstly refers to the inquiry history database 25 (FIG. 4) and searches it for a record in which "NULL" is stored in the proposed configuration application result registration date and time column 25G (FIG. 4) (S50), and judges whether such record has been successfully detected or not (S51). Then, If the application result registration unit 31 obtains a negative result in this judgment, it terminates this application result registration processing.

On the other hand, if the application result registration unit 31 obtains an affirmative result in the judgment of step S51, it reads the configuration generation result file FL3 (FIG. 5(C)) on the path whose pathname is stored in the configuration generation result column 25F (FIG. 4) of that record, from the auxiliary storage apparatus 13. Moreover, the application result registration unit 31 transmits the read data of the configuration generation result file FL3, together with an instruction to display the application result registration screen 60 described earlier with reference to FIG. 10, to the client 2 of the user, who is assigned the user ID stored in the user ID column 25B (FIG. 4) of the relevant record, via the network interface 14 (FIG. 1) (S52). As a result, such application result registration screen 60 is displayed on the client 2.

Subsequently, the application result registration unit 31 waits for a response, which is input by the user on the application result registration screen 60, to be transmitted from the client 2 (S53). Then, when the response is eventually transmitted from the client 2, the application result registration unit 31 judges, based on that response, whether or not the user has applied any one of the proposed system configurations proposed to that user (S54).

Then, if the application result registration unit 31 obtains a negative result in this judgment, it stores the date and time when the response was obtained in the proposed configuration application result registration date and time column 25G (FIG. 4) of the relevant record in the inquiry history database 25 and stores "NULL" in the applied proposed configuration column 25H (FIG. 4) and the application object column 25I (FIG. 4) respectively (S55), and then terminates this application result registration processing.

On the other hand, if the application result registration unit 31 obtains an affirmative result in the judgment of step S54, it extracts the identification information of the proposed system configuration, which was applied by the user, from the relevant response and stores the extracted identification information in the applied proposed configuration column 25H of the relevant record in the inquiry history database 25. Moreover, the application result registration unit 31 stores the date and time of that time in the proposed configuration application result registration date and time column 25G and also stores the customer name of the user in the application object column 25I (S56). Furthermore, the application result registration unit 31 also stores the customer name of the user in the application achievements column 26H of the analysis catalog database. Then, the application result registration unit 31 terminates this application result registration processing.

(4-5) Cloud Service Database Update Processing

Figure 17:
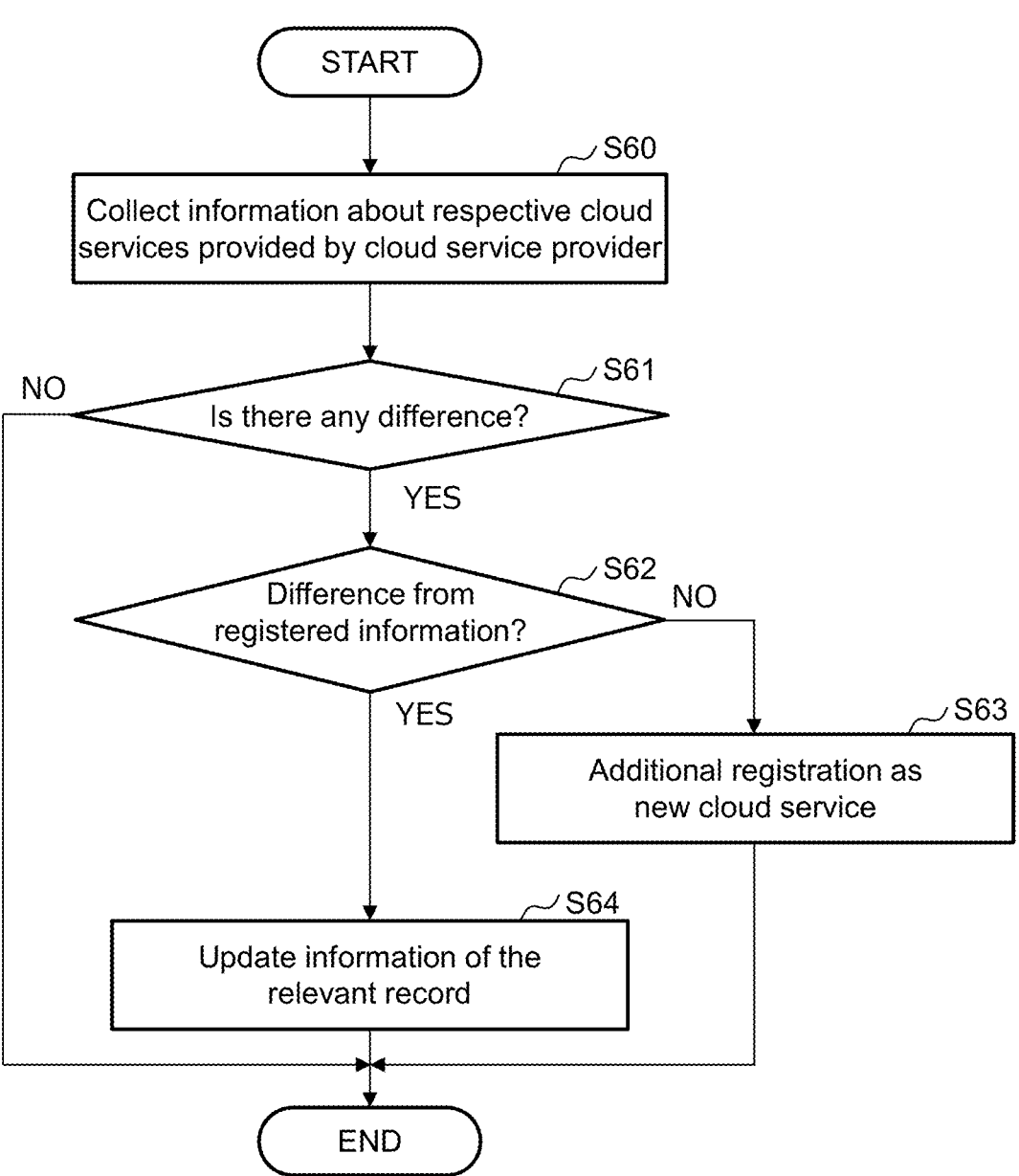
FIG. 17 is a flowchart illustrating a processing sequence for cloud service database update processing.

On the other hand, FIG. 17 shows a processing sequence for the cloud service update processing periodically executed by the cloud service database update unit 33. According to the processing sequence illustrated in FIG. 17, the cloud service database update unit 33 updates the cloud service database 27 (FIG. 7) when the content (including the fee) of the cloud service provided by the cloud service provider is updated, when the provision of a new cloud service is started, or the provision of the existing cloud service ends.

Practically, when the cloud service database update unit 33 starts this cloud service database update processing, it firstly collects information about each cloud service provided by the cloud service provider by, for example, crawling the website of each cloud service provider (S60).

Subsequently, the cloud service database update unit 33 compares the collected various kinds of information about each cloud service with various kinds of information about each cloud service registered in the cloud service database 27 to judge whether or not there is any difference between them (S61). Then, if the cloud service database update unit 33 obtains a negative result in this judgment, it terminates the cloud service database update processing.

On the other hand, if the cloud service database update unit 33 obtains an affirmative result in the judgment of step S51, it judges whether or not the difference detected in step S61 is the difference from the information already registered in the cloud service database 27 (S62).

Obtaining the affirmative result in this judgment means that there has been a change in the content of the existing cloud service already registered in the cloud service database 27. Therefore, under this circumstance, the cloud service database updates unit 33 update the information of the cloud service registered in the cloud service database 27 with the new content obtained in step S60 (S63). Incidentally, this change includes changing the value of the availability column 27G (FIG. 7) of the cloud service database 27 from "Possible" to "Impossible" when the provision of the existing cloud service is terminated. Then, the cloud service database update unit 33 terminates the cloud service database update processing.

On the other hand, obtaining the negative result in step S62 means that a new cloud service which has not yet registered in the cloud service database 27 has been detected. Therefore, under this circumstance, the cloud service database update unit 33 additionally registers the necessary information about the cloud service obtained in step S60 in the cloud service database 27 (S64) and then terminates the cloud service database update processing.

(4-6) User Notification Processing

Figure 18A:
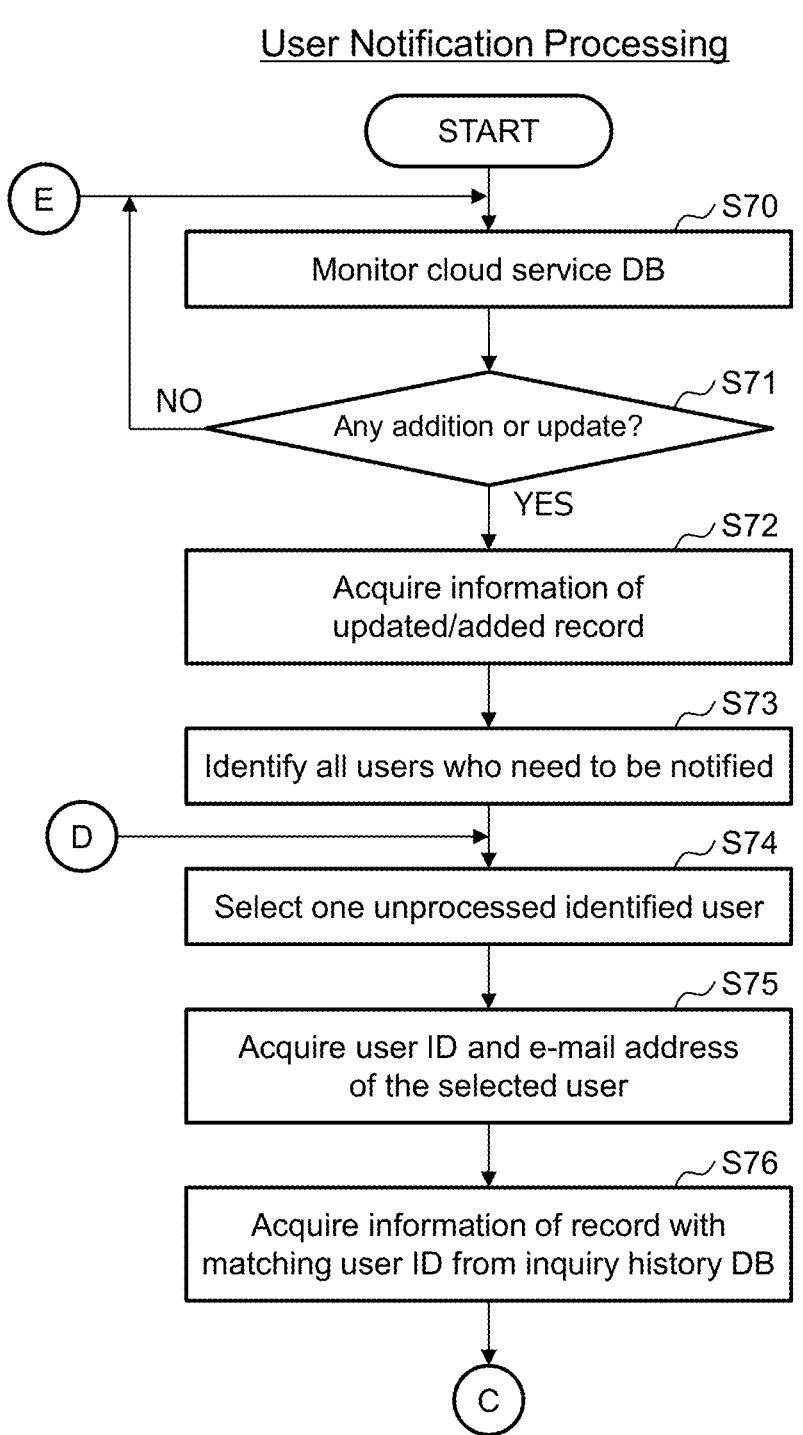
FIG. 18A is a flowchart illustrating a processing sequence for user notification processing.
Figure 18B:
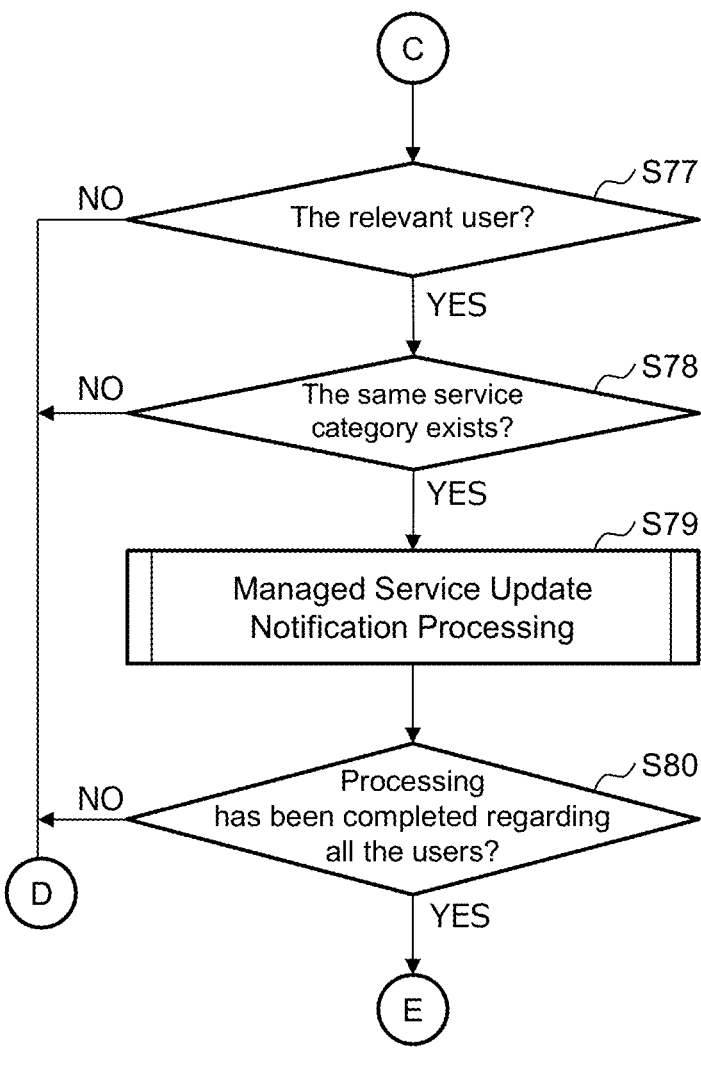
FIG. 18B is a flowchart illustrating a processing sequence for the user notification processing.

On the other hand, FIG. 18A and FIG. 18B illustrate a processing sequence for the user notification processing executed by the user notification unit 34 (FIG. 1). According to the processing sequence illustrated in FIG. 18A and FIG. 18B, when the content of the cloud service is changed or the provision of a new cloud service is started, the user notification unit 34 transmits the managed service update notice to the user for whom the system configuration of the data analysis task system should be reviewed.

Practically, when the power of the system configuration proposing apparatus 3 is turned on, the user notification unit 34 starts the user notification processing, firstly monitors the cloud service database 27 (FIG. 7) (S70), and judges whether or not the content of the cloud service registered in the cloud service database 27 has been updated (not including deletion) or a new cloud service has been registered (S71).

Then, if the user notification unit 34 obtains a negative result in this judgment, it returns to step S70 and then repeats a loop of steps from step S70 to step S71 and then to step S70 until it obtains an affirmative result in step S71.

Then, when the user notification unit 34 detects that the content of any of the cloud services registered in the cloud service database 27 has been updated or the new cloud service has been registered, it obtains information of a record corresponding to the updated or added cloud service from the cloud service database 27 (S72).

Moreover, by referring to the user database 24 (FIG. 3), the user notification unit 34 identifies all the users requesting the aforementioned managed service update notice (the users corresponding to records in which "Necessary" is stored in the notification necessity column 24C) (S73).

Subsequently, the user notification unit 34 selects one user for whom step S75 and subsequent steps have not been processed from the users identified in step S73 (S74) and obtains the user ID and the e-mail address of the selected user (hereinafter referred to as the "selected user") from the user database 24 (S75).

Next, the user notification unit 34 obtains information of all the records in which the user ID obtained in step S75 is stored in the user ID column 25B (FIG. 4), respectively from the records in the inquiry history database 25 (FIG. 4) (S76).

Moreover, the user notification unit 34 judges, based on the obtained information of each record, whether the selected user is a user to whom proposed system configurations were proposed before, and who has applied any one of the proposed system configurations (hereinafter referred to as a "first-type user"), or is a user to whom the proposed system configurations were proposed before, but who has not been inquired of about whether any one of the proposed system configurations has been applied or not (hereinafter referred to as a "second-type user") (S77).

The former judgement can be made based on whether or not the identification information of any proposed system configuration is stored in the applied proposed configuration column 25H. Moreover, the latter judgement can be made based on whether or not any pathname is stored in the configuration generation result column 25F (FIG. 4) and the proposed configuration application result registration date and time column 25G, the applied proposed configuration column 25H, and the application object column 25I are "NULL."

Then, if the user notification unit 34 obtains a negative result in this judgment, it returns to step S74 and then repeats processing of step S74 and subsequent steps by sequentially switching the relevant user selected in step S74 to another user regarding whom step S75 and subsequent steps have not been processed.

Moreover, if the user notification unit 34 obtains an affirmative result in the judgment of step S77, and when the selected user is the first-type user, it judges whether or not that user uses a cloud service of the same service category as the updated or added cloud service detected in step S71 for the proposed system configuration applied by the selected user. Moreover, when the selected user is the second-type user, the user notification unit 34 judges whether or not any one of the proposed system configurations proposed to the selected user uses the cloud service of the same service category as the updated or added cloud service detected in step S71 (S78).

Then, if the user notification unit 34 obtains a negative result in this judgment, it returns to step S74 and then repeats processing of step S74 and subsequent steps by sequentially switching the relevant user selected in step S74 to another user regarding whom step S75 and subsequent steps have not been processed.

On the other hand, if the user notification unit 34 obtains an affirmative result in the judgment of step S78, it executes the managed service update notification processing that transmits the managed service update notice to the selected user as necessary (S79).

Subsequently, the user notification unit 34 judges whether or not the processing in step S74 and subsequent steps has been terminated for all the users identified in step S73. Then, if the user notification unit 34 obtains a negative result in this judgment, it returns to step S74 and then repeats processing of step S74 and subsequent steps by sequentially switching the relevant user to be selected in step S74 to another user regarding whom step S75 and subsequent steps have not been processed.

Then, if the user notification unit 34 eventually obtains an affirmative result in step S80 by finishing executing the processing from step S75 to step S79 with respect to all the users identified in step S73, it returns to step S70 and then repeats the processing of step S70 and subsequent steps.

Figure 19:
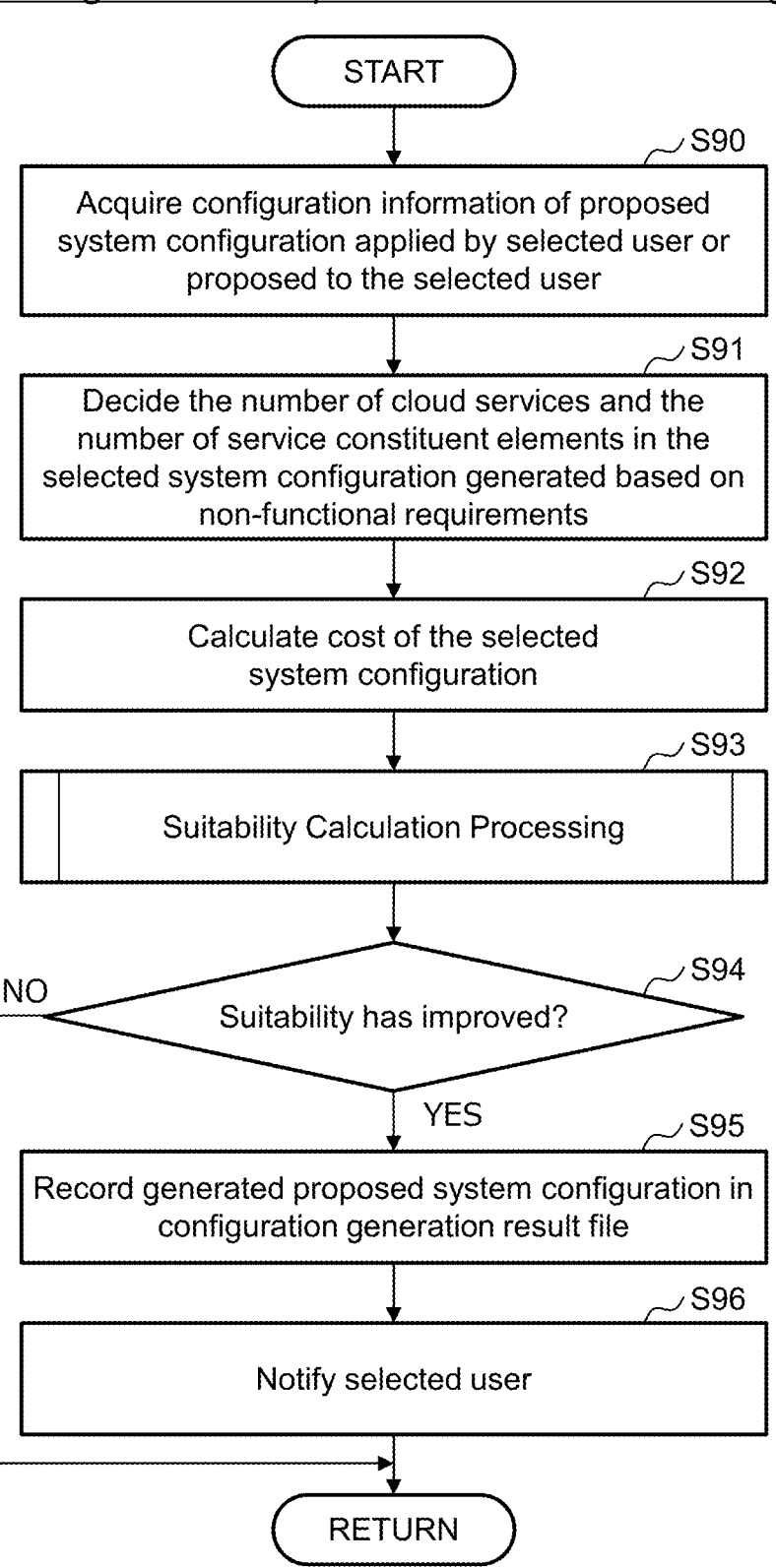
FIG. 19 is a flowchart illustrating a processing sequence for managed service update notification processing.

FIG. 19 illustrates the specific processing content of the user notification unit 34 in step S79 of FIG. 18B. When the process proceeds to step S79 of the user notification processing (FIG. 18A and FIG. 18B), the user notification unit 34 starts the managed service update notification processing illustrated in FIG. 19.

Then, by firstly referring to the inquiry history database 25 (FIG. 4), if the selected user is the first-type user, the user notification unit 34 obtains the configuration information of the proposed system configuration applied by the selected user. Moreover, if the selected user is the second-type user, the user notification unit 34 obtains the configuration information of the proposed system configuration which uses the cloud service of the same service category as the updated or added cloud service detected in step S71 from among the proposed system configurations proposed to the selected user (S90).

Specifically, when the selected user is the first-type user, the user notification unit 34 identifies a record in which the user ID of the selected user is stored in the user ID column 25B (FIG. 4) from among the records in the inquiry history database 25. Moreover, the user notification unit 34 reads the configuration generation result file FL3 (FIG. 5(C)) on the path whose pathname is stored in the configuration generation result column 25F of the identified record and obtains the configuration information of the proposed system configuration applied by the selected user from the read configuration generation result file FL3.

Moreover, if the selected user is the second-type user, the user notification unit 34 identifies the record in which the user ID of the selected user is stored in the user ID column 25B (FIG. 4) from among the records in the inquiry history database 25. Moreover, the user notification unit 34 reads the configuration generation result file FL3 (FIG. 5(C)) on the path whose pathname is stored in the configuration generation result column 25F of the identified record and obtains the configuration information of the proposed system configuration which uses the cloud service of the same service category as the updated or added cloud service detected in step S71 from the read configuration generation result file FL3.

Subsequently, the user notification unit 34 calculates the suitability of the applied proposed cloud configuration based on the configuration information of the aforementioned proposed system configuration obtained in step S90 in the same manner as in step S28 to step S30 of the aforementioned configuration generation processing with respect to FIG. 13A and FIG. 13B when the cloud service of the same service category as the updated/added cloud service in the proposed system configuration is replaced with the updated/added cloud service (step S91 to step S93).

Moreover, the user notification unit 34 then judges whether or not the suitability calculated in step S91 to step S93 has improved from (or becomes higher than) the suitability of the original proposed system configuration (S94). Then, if the user notification unit 34 obtains a negative result in this judgment, it terminates the managed service update notification processing.

On the other hand, if the user notification unit 34 obtains an affirmative result in this judgment, it records the necessary information about the applied proposed cloud configuration in the configuration generation result file FL3 which obtained the configuration information in step S91 when the cloud service of the same service category as the updated/added cloud service in the proposed system configuration is replaced with the updated/added cloud service (S95).

Moreover, the user notification unit 34: transmits the managed service update notice to the selected user that there has been an update to the cloud service and a proposed system configuration with higher suitability can be created (S96); and then terminates the managed service update notification processing.

Figure 20:
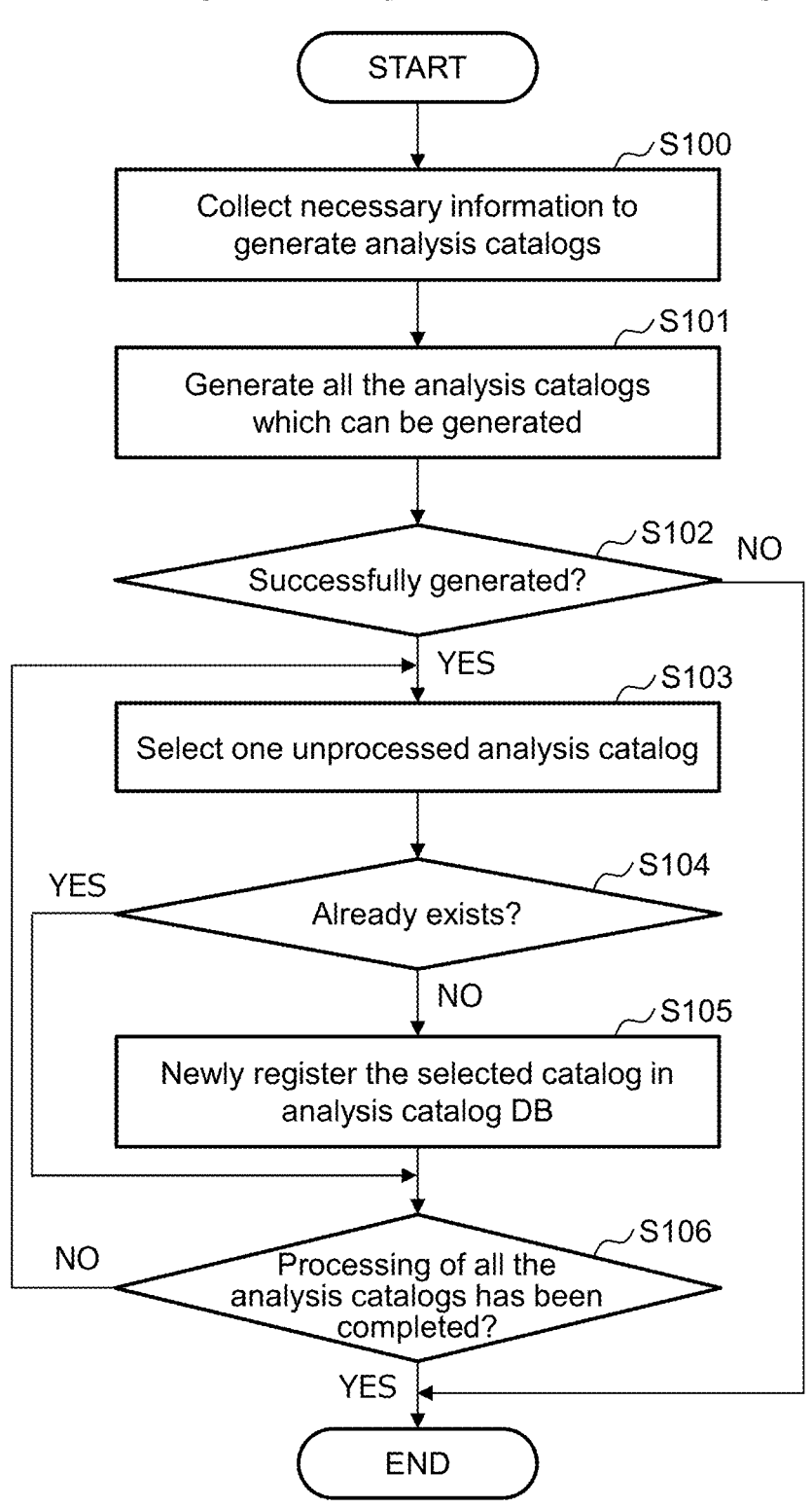
FIG. 20 is a flowchart illustrating a processing sequence for first analysis catalog database update processing.

(4-7) Analysis Catalog Database Update Processing (4-7-1) First Analysis Catalog Database Update Processing FIG. 20 illustrates first analysis catalog database update processing which is regularly executed by the analysis catalog database update unit 32 (FIG. 1). The analysis catalog database update unit 32 generates a new analysis catalog 15 (FIG. 2) as necessary and registers the generated analysis catalog 15 in the analysis catalog database 26 (FIG. 6) in accordance with the processing sequence as illustrated in this FIG. 20.

Practically, after starting this first analysis catalog database update processing, the analysis catalog database update unit 32 firstly collects new information to generate analysis catalogs, by means of crawling, from websites of the respective cloud service providers and websites or the like where articles and theses regarding the data analysis processing are posted (S100).

For example, if information indicating a new processing flow of the data analysis processing is posted on some website, the analysis catalog database update unit 32 collects such information.

Subsequently, the analysis catalog database update unit 32 generates all analysis catalogs 15 which can be generated based on the information collected in step S100 (S101), and then judges whether or not at least one analysis catalog 15 was successfully generated in step S101 (S102). Then, if the analysis catalog database update unit 32 obtains a negative result in this judgment, the analysis catalog database update unit 32 terminates this analysis catalog database update processing.

On the other hand, if the analysis catalog database update unit 32 obtains an affirmative result in the judgment of step S102, it selects one analysis catalog 15 regarding which processing of step S104 and subsequent steps have not been processed, from among the analysis catalogs 15 generated in step S101 (S103).

Moreover, the analysis catalog database update unit 32 judges whether or not the selected analysis catalog 15 already exists in the analysis catalog database 26 (S104). This judgment is performed by sequentially comparing the analysis catalog 15 selected in step S103 with the existing analysis catalogs 15 which are already registered in the analysis catalog database 26.

Then, if the analysis catalog database update unit 32 obtains an affirmative result in this judgment, it proceeds to step S106. On the other hand, if the analysis catalog database update unit 32 obtains a negative result in the judgment of step S104, it newly registers the analysis catalog 15 selected in step S103 in the analysis catalog database 26 (S105).

Subsequently, the analysis catalog database update unit 32 judges whether or not the execution of the processing of step S102 and subsequent steps have been completed or not with respect to all the analysis catalogs 15 generated in step S101 (S106).

Then, if the analysis catalog database update unit 32 obtains a negative result in this judgment, it returns to step S103 and then repeats processing from step S103 to step S106 by sequentially switching the analysis catalog 15 to be selected in step S103 to another analysis catalog 15 regarding which step S104 and subsequent steps have not been processed. As a result of this iterative processing, new analysis catalogs 15 which have not been registered in the analysis catalog database 26 until then, from among the analysis catalogs 15 generated in step S101, are sequentially registered in the analysis catalog database 26.

Then, if the analysis catalog database update unit 32 obtains an affirmative result in step S106 by completing the execution of the processing of step S104 and subsequent steps with respect to all the analysis catalogs 15 generated in step S101, it terminates this first analysis catalog database update processing.

(4-7-2) Second Analysis Catalog Database Update Processing

Figure 21:
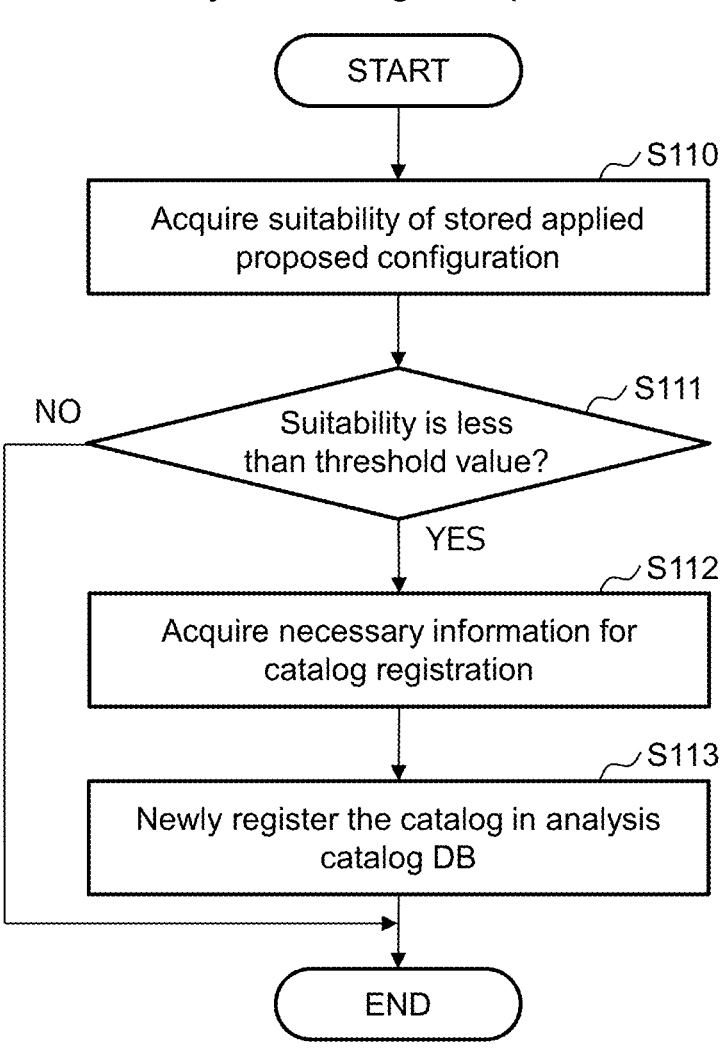
FIG. 21 is a flowchart illustrating a processing sequence for second analysis catalog database update processing.

On the other hand, FIG. 21 illustrates second analysis catalog database update processing executed by the analysis catalog database update unit 32 (FIG. 1) when the identification information of the proposed system configuration proposed by the system configuration proposing apparatus 3 and applied by the user is stored in the applied proposed configuration column 25H of any one of records of the inquiry history database 25 (FIG. 4).

When the user applies a proposed system configuration with low suitability in accordance with the processing sequence illustrated in this FIG. 21, the analysis catalog database update unit 32 generates a new analysis catalog 15 based on that proposed system configuration and registers it in the analysis catalog database 26 (FIG. 6).

Practically, when the identification information of the proposed system configuration is stored in the applied proposed configuration column 25H (FIG. 4) of any one of records in the inquiry history database 25 (FIG. 4), the analysis catalog database update unit 32 starts this second analysis catalog database update processing.

Then, the analysis catalog database update unit 32 firstly obtains the suitability of the proposed system configuration (S110). Specifically, the analysis catalog database update unit 32 reads the configuration generation result file FL3

(FIG. 5(C)) on the path whose pathname is stored in the configuration generation result column 25F (FIG. 4) of that record and obtains the suitability of the proposed system configuration from the read configuration generation result file FL3.

Subsequently, the analysis catalog database update unit 32 judges whether the suitability obtained in step S110 is less than a preset threshold value or not (S111). Then, if the analysis catalog database update unit 32 obtains a negative result in this judgment, it terminates this second analysis catalog database update processing.

On the other hand, if the analysis catalog database update unit 32 obtains an affirmative result in the judgment of step S111, it obtains necessary information, from the configuration generation result file FL3 which was read in step S110, in order to generate a new analysis catalog 15 with that proposed system configuration and register it in the analysis catalog database 26 (S112).

Moreover, the analysis catalog database update unit 32 stores the information, which was obtained in step S112, in the analysis catalog database 26 and registers the analysis catalog 15 in the analysis catalog database 26 (S113). Then, the analysis catalog database update unit 32 terminates this second analysis catalog database update processing.

Accordingly, when the user applies the proposed system configuration with low suitability, a new analysis catalog 15 is generated based on the proposed system configuration and is registered in the analysis catalog database 26, so that when presenting a proposed system configuration to the user who desires a similar system configuration, it is possible to enhance the suitability of the proposed system configuration which has the relevant system configuration.

Consequently, the proposed system configuration which has the relevant system configuration can be displayed at a higher rank in the generated proposed system configuration list area 52 of the configuration generation result display screen 50 (FIG. 9) and, therefore, the proposed system configuration having the system configuration desired by the user can be presented more preferentially to the user.

(5) Advantageous Effects of this Embodiment

The system configuration proposing apparatus 3 according to this embodiment as described above: extracts features such as a data structure(s) of data to be handled by a data analysis task system, which is to be constructed on a cloud by the customer, in the data analysis task system, a method(s) for analyzing the data, and a method(s) for searching the data; and extracts the analysis catalogs 15 which satisfy the extracted features from the analysis catalog database 26. Moreover, the system configuration proposing apparatus 3 generates all the proposed system configurations which can be generated by applying the respective cloud services suited for the configuration generation conditions with respect to each service constituent element 16 of the extracted analysis catalogs and causes these generated proposed system configurations to be displayed on the client 2.

Therefore, if this system configuration proposing apparatus 3 is employed, the proposed system configurations suited for the set configuration generation conditions can be proposed without intervention of a human's judgment and it is thereby possible to propose an optimum system configuration which practically sufficiently satisfies the customer's wishes.

(6) Other Embodiments

Incidentally, the aforementioned embodiment has described the case where the system configuration proposing apparatus 3 which is configured from one server apparatus is equipped with the inquiry acceptance unit 28, the configuration feature extraction unit 29, the configuration generation unit 30, the application result registration unit 31, the analysis catalog database update unit 32, the cloud service database update unit 33, and the user notification unit 34; however, the present invention is not limited to this example and these programs may be distributed and mounted in a plurality of computer apparatuses which configure a distributed computing system.

Moreover, the aforementioned embodiment has described the case where the managed service update notification processing for transmitting the managed service update notice to the relevant user is executed only when the suitability of the proposed system configuration which uses the cloud service updated or newly added has enhanced from the original proposed system configuration in step S79 of the aforementioned user notification processing explained earlier with reference to FIG. 18A and FIG. 18B (see FIG. 19); however, the present invention is not limited to this example and the notice indicating that the cloud service which is currently used has been updated or the provision of a new available cloud service has been started may be immediately transmitted to the relevant user without executing the managed service update notification processing in step S79.

Furthermore, the aforementioned embodiment has described the case where the respective elements to be added inside the parentheses in the aforementioned Expression (1), Expression (2), and Expression (4) are treated equally; however, the present invention is not limited to this example and each element may be weighted. Similarly, regarding the aforementioned Expression (5), the points P of the respective service constituent elements which constitute the analysis catalog may be weighted.

Furthermore, the aforementioned embodiment has described the case where all the proposed system configurations generated by the system configuration proposing apparatus 3 are displayed on the configuration generation result display screen 50; however, the present invention is not limited to this example and, for example, only a specified number of the proposed system configuration with top values of the suitability may be displayed on the configuration generation result display screen 50 or only the proposed system configurations whose suitability is equal to or more than a predetermined threshold value may be displayed on the configuration generation result display screen 50.

Furthermore, the aforementioned embodiment has described the case where the configuration generation conditions, the feature extraction result, and the configuration generation result are formed into separate files without being stored in the inquiry database 25 and the pathnames of the paths to these files are stored in the inquiry database 25; however, the present invention is not limited to this example and the configuration generation conditions, the feature extraction result, and the configuration generation result may be stored in the inquiry database 25.

Furthermore, the aforementioned embodiment has described the case where the configuration generation condition input unit 20, the configuration generation result display unit 21, and the configuration application result input unit 22 of the client 2 generate and display the configuration generation condition setting screen 40, the configuration generation result display screen 50, or the application result registration screen 60 described earlier with reference to FIG. 8 to FIG. 10 on the basis of the information from the system configuration proposing apparatus 3; however, the present invention is not limited to this example and screen data of the configuration generation condition setting screen 40, the configuration generation result display screen 50 or the application result registration screen 60 may be generated on the system configuration proposing apparatus 3 side, while the configuration generation condition setting screen 40, the configuration generation result display screen 50, or the application result registration screen 60 may be just displayed based on the screen data on the configuration generation condition input unit 20, the configuration generation result display unit 21, and the configuration application result input unit 22 side of the client 2.

Furthermore, the aforementioned embodiment has described the case where the catalog extraction unit that extracts catalogs which satisfy the features of the requirements extracted by the configuration feature extraction unit from among a plurality of kinds of catalogs which are prepared in advance and define data processing flows, the cloud service extraction unit that extracts the respective cloud services suited for the requested requirements with respect to each service constituent element of the catalogs extracted by the catalog extraction unit, and the proposed system configuration generating unit that generates one or a plurality of proposed system configurations obtained by combining the cloud services extracted by the cloud service extraction unit in accordance with the catalogs extracted by the cloud service extraction unit are configured by one program (the configuration generation unit 30); however, the present invention is not limited to this example and the catalog extraction unit, the cloud service extraction unit, and the proposed system configuration generating unit may be configured respectively as separate programs.

INDUSTRIAL AVAILABILITY

The present invention can be applied to the system configuration proposing apparatus for presenting proposed configurations of the system configuration on the cloud, which satisfy the requested requirements.

REFERENCE SIGNS LIST

1: system configuration proposing system
2: client
3: system configuration proposing apparatus
11: CPU
15: analysis catalog
16: service constituent element
24: user database
25: inquiry history database
26: analysis catalog database
27: cloud service database
28: inquiry acceptance unit
29: configuration feature extraction unit
30: configuration generation unit
31: application result registration unit
32: analysis catalog database update unit
33: cloud service database update unit
34: user notification unit
40: configuration generation condition setting screen
50: configuration generation result display screen
60: application result registration screen
FL1: configuration generation condition file
FL2: feature extraction result file
FL3: configuration generation result file

35

36

The invention claimed is:

1. An information processing apparatus for presenting proposed configurations, which satisfy requested requirements, of a system configuration on a cloud, wherein the requirements include at least a data structure of data to be handled by a target system to be created, a method for analyzing the data, and a method for searching the data, the information processing apparatus comprising:

a configuration feature extraction unit that extracts features regarding the requirements;

a catalog extraction unit that extracts catalogs which satisfy the features of the requirements extracted by the configuration feature extraction unit from a plurality of kinds of catalogs which are prepared in advance and define data processing flows;

a cloud service extraction unit that extracts respective cloud services suited for the requested requirements with respect to each service constitute element of the catalogs extracted by the catalog extraction unit;

a proposed system configuration generating unit that generates one or a plurality of proposed system configurations obtained by combining the cloud services extracted by the cloud service extraction unit in accordance with the catalogs extracted by the catalog extraction unit; and a system configuration presenting unit that presents each of the proposed system configurations generated by the proposed system configuration generating unit.

2. The information processing apparatus according to claim 1, wherein the proposed system configuration generating unit calculates, with respect to each of the generated proposed system configurations, a degree of how much the proposed system configuration satisfies the requirements as suitability; and wherein the system configuration presenting unit presents the respective proposed system configurations, which are generated by the proposed system configuration generating unit, in descending order of the suitability.

3. The information processing apparatus according to claim 1, wherein the information processing apparatus has a cloud service database in which information about various kinds of the cloud services provided by each of cloud service providers is registered;

wherein regarding each service constituent element of the catalog extracted by the catalog extraction unit, the cloud service extraction unit extracts a cloud service suited to the requested requirements from the cloud services registered in the cloud service database; and wherein the information processing apparatus further comprises a cloud service database update unit that, when each of the cloud service providers collects information about the cloud services, which they respectively provide, and detects an update of the cloud service which exists and is registered in the cloud service database, or the cloud service which is new, updates registered information of the cloud service which exists in the cloud service database in accordance with detected content or registers the cloud service, which is new, in the cloud service database.

4. The information processing apparatus according to claim 1, further comprising a user notification unit that transmits a specified notice to a necessary user when the cloud service which exists has been updated or provision of the cloud service which is new has been started, wherein the user notification unit transmits the specified notice to the user capable of constructing a system which is more suited to the requested requirements than to a current system by using the cloud service which exists and has been updated, or the cloud service which is new.

5. The information processing apparatus according to claim 2, further comprising an application result inquiry unit that inquires of the user about the proposed system configuration applied as the system configuration by the user from among the proposed system configurations presented by the system configuration presenting unit, wherein if the suitability of the proposed system configuration which is obtained by the application result inquiry unit and applied as the system configuration by the user is less than a specified threshold value, the catalog with the proposed system configuration is newly generated.

6. An information processing method executed by an information processing apparatus for presenting proposed configurations, which satisfy requested requirements, of a system configuration on a cloud, wherein the requirements include at least a data structure of data to be handled by a target system to be created, a method for analyzing the data, and a method for searching the data, the information processing method comprising:

a first step of extracting features regarding the requirements;

a second step of extracting catalogs which satisfy the extracted features of the requirements from a plurality of kinds of catalogs which are prepared in advance and define data processing flows;

a third step of extracting respective cloud services suited for the requested requirements with respect to each service constitute element of the extracted catalogs;

a fourth step of generating one or a plurality of proposed system configurations obtained by combining the extracted cloud services in accordance with the extracted catalogs; and a fifth step of presenting each of the generated proposed system configurations.

7. The information processing method according to claim 6, wherein in the fourth step, the information processing apparatus calculates, with respect to each of the generated proposed system configurations, a degree of how much the proposed system configuration satisfies the requirements as suitability; and wherein in the fifth step, the information processing apparatus presents the respective generated proposed system configurations in descending order of the suitability.

8. The information processing method according to claim 6, wherein the information processing apparatus has a cloud service database in which information about various kinds of the cloud services provided by each of cloud service providers is registered;

wherein in the third step, regarding each service constituent element of the catalog extracted by the catalog extraction unit, the information processing apparatus extracts a cloud service suited to the requested requirements from the cloud services registered in the cloud service database; and wherein when the information processing apparatus collects information about the cloud services, which are provided by each of the cloud service providers, and detects an update of the cloud service which exists and is registered in the cloud service database, or the cloud service which is new, the information processing apparatus updates registered information of the cloud service which exists in the cloud service database in accordance with detected content or registers the cloud service, which is new, in the cloud service database.

9. The information processing method according to claim 6, wherein when the cloud service which exists has been updated or provision of the cloud service which is new has been started, the information processing apparatus transmits a specified notice to a user capable of constructing a system which is more suited to the requested requirements than to a current system by using the cloud service which exists and has been updated, or the cloud service which is new.

10. The information processing method according to claim 7, further comprising:

a sixth step of inquiring of the user about the proposed system configuration applied as the system configuration by the user from among the presented proposed system configurations; and a seventh step, which is executed if the suitability of the proposed system configuration obtained and applied by the user as the system configuration is less than a specified threshold value, of newly generating the catalog with the proposed system configuration.

*     *     *     *     *